United States Patent
Rabinovich et al.

(10) Patent No.: US 11,048,978 B2
(45) Date of Patent: Jun. 29, 2021

(54) META-LEARNING FOR MULTI-TASK LEARNING FOR NEURAL NETWORKS

(71) Applicant: Magic Leap, Inc., Plantation, FL (US)

(72) Inventors: Andrew Rabinovich, San Francisco, CA (US); Vijay Badrinarayanan, Mountain View, CA (US); Srivignesh Rajendran, San Francisco, CA (US); Chen-Yu Lee, Sunnyvale, CA (US)

(73) Assignee: Magic Leap, Inc., Plantation, FL (US)

( * ) Notice: Subject to any disclaimer, the term of this patent is extended or adjusted under 35 U.S.C. 154(b) by 162 days.

(21) Appl. No.: 16/185,582

(22) Filed: Nov. 9, 2018

(65) Prior Publication Data

US 2019/0147298 A1 May 16, 2019

Related U.S. Application Data

(60) Provisional application No. 62/586,154, filed on Nov. 14, 2017.

(51) Int. Cl.
*G06K 9/62* (2006.01)
*G06N 3/04* (2006.01)
*G06N 3/08* (2006.01)

(52) U.S. Cl.
CPC .......... *G06K 9/6262* (2013.01); *G06N 3/04* (2013.01); *G06N 3/0445* (2013.01); *G06N 3/0472* (2013.01); *G06N 3/084* (2013.01)

(58) Field of Classification Search
CPC ...... G06K 9/6262; G06N 3/04; G06N 3/0445; G06N 3/0454; G06N 3/0472; G06N 3/084
See application file for complete search history.

(56) References Cited

U.S. PATENT DOCUMENTS 6,850,221 B1  2/2005  Tickle
9,081,426 B2  7/2015  Armstrong
(Continued)

FOREIGN PATENT DOCUMENTS

WO   WO 2019/099305   5/2019

OTHER PUBLICATIONS

Zhang, Honglun, et al. "Multi-task label embedding for text classification." arXiv preprint arXiv: 1710.07210 (2017). (Year: 2017).*
(Continued)

*Primary Examiner* — Nirav G Patel
(74) *Attorney, Agent, or Firm* — Knobbe, Martens, Olson & Bear, LLP

(57) ABSTRACT

Methods and systems for meta-learning are described for automating learning of child tasks with a single neural network. The order in which tasks are learned by the neural network can affect performance of the network, and the meta-learning approach can use a task-level curriculum for multi-task training. The task-level curriculum can be learned by monitoring a trajectory of loss functions during training. The meta-learning approach can learn to adapt task loss balancing weights in the course of training to get improved performance on multiple tasks on real world datasets. Advantageously, learning to dynamically balance weights among different task losses can lead to superior performance over the use of static weights determined by expensive random searches or heuristics. Embodiments of the meta-learning approach can be used for computer vision tasks or natural language processing tasks, and the trained neural networks can be used by augmented or virtual reality devices.

10 Claims, 15 Drawing Sheets

(56) References Cited

U.S. PATENT DOCUMENTS

| | | | |
|---|---|---|---|
| 9,215,293 | B2 | 12/2015 | Miller |
| 9,348,143 | B2 | 5/2016 | Gao et al. |
| 9,417,452 | B2 | 8/2016 | Schowengerdt et al. |
| 9,470,906 | B2 | 10/2016 | Kaji et al. |
| 9,547,174 | B2 | 1/2017 | Gao et al. |
| 9,671,566 | B2 | 6/2017 | Abovitz et al. |
| 9,740,006 | B2 | 8/2017 | Gao |
| 9,791,700 | B2 | 10/2017 | Schowengerdt et al. |
| 9,851,563 | B2 | 12/2017 | Gao et al. |
| 9,857,591 | B2 | 1/2018 | Welch et al. |
| 9,874,749 | B2 | 1/2018 | Bradski |
| 2012/0127062 | A1 | 5/2012 | Bar-Zeev et al. |
| 2013/0082922 | A1 | 4/2013 | Miller |
| 2013/0117377 | A1 | 5/2013 | Miller |
| 2013/0125027 | A1 | 5/2013 | Abovitz |
| 2014/0071539 | A1 | 3/2014 | Gao |
| 2014/0177023 | A1 | 6/2014 | Gao et al. |
| 2014/0218468 | A1 | 8/2014 | Gao et al. |
| 2014/0267420 | A1 | 9/2014 | Schowengerdt |
| 2014/0306866 | A1 | 10/2014 | Miller et al. |
| 2015/0016777 | A1 | 1/2015 | Abovitz et al. |
| 2015/0103306 | A1 | 4/2015 | Kaji et al. |
| 2015/0178939 | A1 | 6/2015 | Bradski et al. |
| 2015/0205126 | A1 | 7/2015 | Schowengerdt |
| 2015/0222883 | A1 | 8/2015 | Welch |
| 2015/0222884 | A1 | 8/2015 | Cheng |
| 2015/0268415 | A1 | 9/2015 | Schowengerdt et al. |
| 2015/0302652 | A1 | 10/2015 | Miller et al. |
| 2015/0309263 | A2 | 10/2015 | Abovitz et al. |
| 2015/0326570 | A1 | 11/2015 | Publicover et al. |
| 2015/0346490 | A1 | 12/2015 | TeKolste et al. |
| 2015/0346495 | A1 | 12/2015 | Welch et al. |
| 2016/0011419 | A1 | 1/2016 | Gao |
| 2016/0026253 | A1 | 1/2016 | Bradski et al. |
| 2016/0174902 | A1 | 6/2016 | Georgescu et al. |
| 2017/0039456 | A1 | 2/2017 | Saberian et al. |
| 2017/0148433 | A1 | 5/2017 | Catanzaro et al. |
| 2019/0034798 | A1* | 1/2019 | Yu ...................... G06N 3/0481 |

OTHER PUBLICATIONS

International Search Report and Written Opinion for PCT Application No. PCT/US 18/60158, dated Mar. 8, 2019, 2019.
Invitation to Pay Additional Fees for PCT Application No. PCT/US 18/60158, mailed Jan. 8, 2019.
Allogower, E.L., et al., Introduction to Numerical Continuation Methods, Colorado State University Jan. 1990.
Andrychowicz M., et al., "Learning to learn by gradient descent by gradient descent," arXiv:1606.04474v2 [cs.NE] Nov. 30, 2016.
Bai, M. et al., "Deep Watershed Transform for Instance Segmentation," 2017 IEEE Conference on Computer Vision and Pattern Recognition (CVPR), pp. 5221-5229, Jul. 2017.
Bello, I., et al., "Neural Optimizer Search with Reinforcement Learning," Proceedings of the 34th International Conference on Machine Learning, Sydney, Australia, PMLR 70, Sep. 2017.
Bengio, Y., et al., "Curriculum Learning," Proceedings of the 26 th International Conference on Machine Learning, Montreal, Canada, Jun. 2009.
Couprie, C., et al., "Indoor Semantic Segmentation using depth information," arXiv:1301.3572v2 [cs.CV] Mar. 14, 2013.
Dai J. et al., "R-FCN: Object Detection via Region-based Fully Convolutional Networks", in Advances in neural information processing systems; (Jun. 21, 2016) Retrieved from <https://arxiv.org/pdf/1605.06409.pdf in 11 pages.
Dvornik, N., et al., "BlitzNet: A Real-Time Deep Network for Scene Understanding," arXiv:1708.02813v1 [cs.CV] Aug. 9, 2017.
Eigen, et al., "Predicting Depth, Surface Normals and Semantic Labels with a Common Multi-Scale Convolutional Architecture," Dept. of Computer Science, Courant Institute, New York University, Facebook AI Research, arXiv:1411.4734v4 [cs.CV] Dec. 17, 2015.
Graves, et al., "Automated Curriculum Learning for Neural Networks," arXiv:1704.03003v1 [cs.NE] Apr. 10, 2017.
He et al., "Mask R-CNN," arXiv:1703.06870v3 [cs.CV] Jan. 24, 2018.
Ioffe S. et al., "Batch Normalization: Accelerating Deep Network Training by Reducing Internal Covariate Shift", arXiv:1502.03167v3 [cs.LG] Mar. 2, 2015.
Kendall, et al. "Multi-Task Learning Using Uncertainty to Weigh Losses for Scene Geometry and Semantics," arXiv.1705.07115v3 [cs.CV] Apr. 24, 2018.
Kingma, D., et al., "Adam: A Method for Stochastic Optimization," Published as a conference paper at ICLR 2015. arXiv:1412.6980v9 [cs.LG] Jan. 30, 2017.
Li, K., et al., "Learning to Optimize," arXiv:1606.01885v1 [cs.LG] Jun. 6, 2016.
Liu W. et al., "SSD: Single Shot MultiBo Detector", arXiv e-print arXiv:1512.02325v5, Dec. 29, 2016 in 17 pages.
Long, et al. "Learning Multiple Tasks with Deep Relationship Networks," arXiv:1506.02117v2 [cs.LG] Feb. 16, 2017.
Lu, et al. "Fully-adaptive Feature Sharing in Multi-Task Networks with Applications in Person Attribute Classification," IEEE Xplore, pp. 5334-5343, Jul. 2017.
Mishra, N., et al., "Meta-Learning with Temporal Convolutions," arXiv:1707.03141v1 [cs.AI] Jul. 11, 2017.
Misra, et al. "Cross-stich Networks for Multi-task Learning," arXiv:1604.03539v1 [cs.CV] Apr. 12, 2016.
Nair et al., "Rectified Linear Units Improve Restricted Boltzmann Machines," In ICML, Haifa, Israel Jun. 2010.
Pathak, D., et al., "Curiosity-driven Exploration by Self-supervised Prediction," arXiv:1705.05363v1 [cs.LG] May 15, 2017.
Redmon et al., "You Only Look Once: Unified, Real-Time Object Detection", Proceedings of the IEEE Conference on Computer Vision and Pattern Recognition (Jun. 27-30, 2016) pp. 779-788.
Ren et al.,"Faster R-CNN: Towards real-time object detection with region proposal networks", arxiv e-print arXiv:1506.01497v3; Jan. 6, 2016 in 14 pages.
Ruder, "An Overview of Multi-Task Learning in Deep Neural Networks," arXiv:1706.05098v1 [cs.LG] Jun. 15, 2017.
Silberman, et al., "Indoor Segmentation and Support Inference from RGBD Images," ECCV-12 submission ID 1079, Oct. 2012, in 14 pages.
Silver, D., et al., "Mastering the game of Go without human knowledge," Nature, vol. 550, Oct. 19, 2017.
Ummenhofer, B., et al., "DeMoN: Depth and Motion Network for Learning Monocular Stereo," arXiv:1612.02401v2 [cs.CV] Apr. 11, 2017.
Zoph, B., et al., "Neural Architecture Search With Reinforcement Learning," arXiv:1611.01578v2 [cs.LG] Feb. 15, 2017.
International Preliminary Report on Patentability for PCT Application No. PCT/US 18/60158, dated May 19, 2020.

* cited by examiner

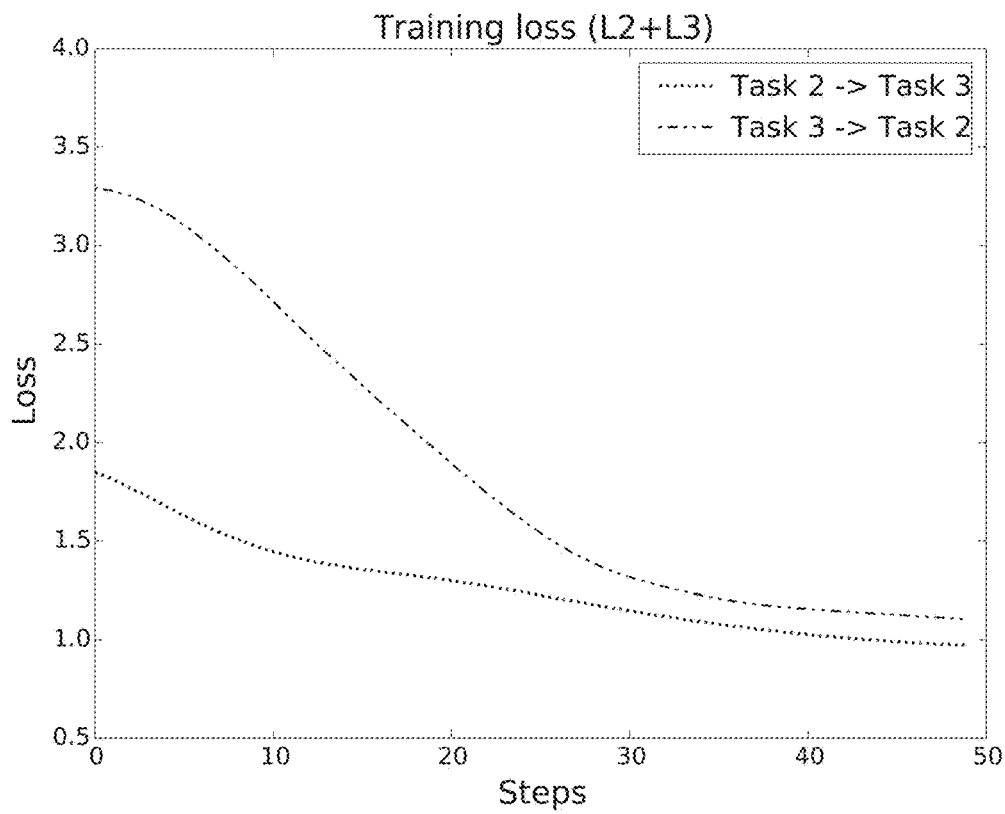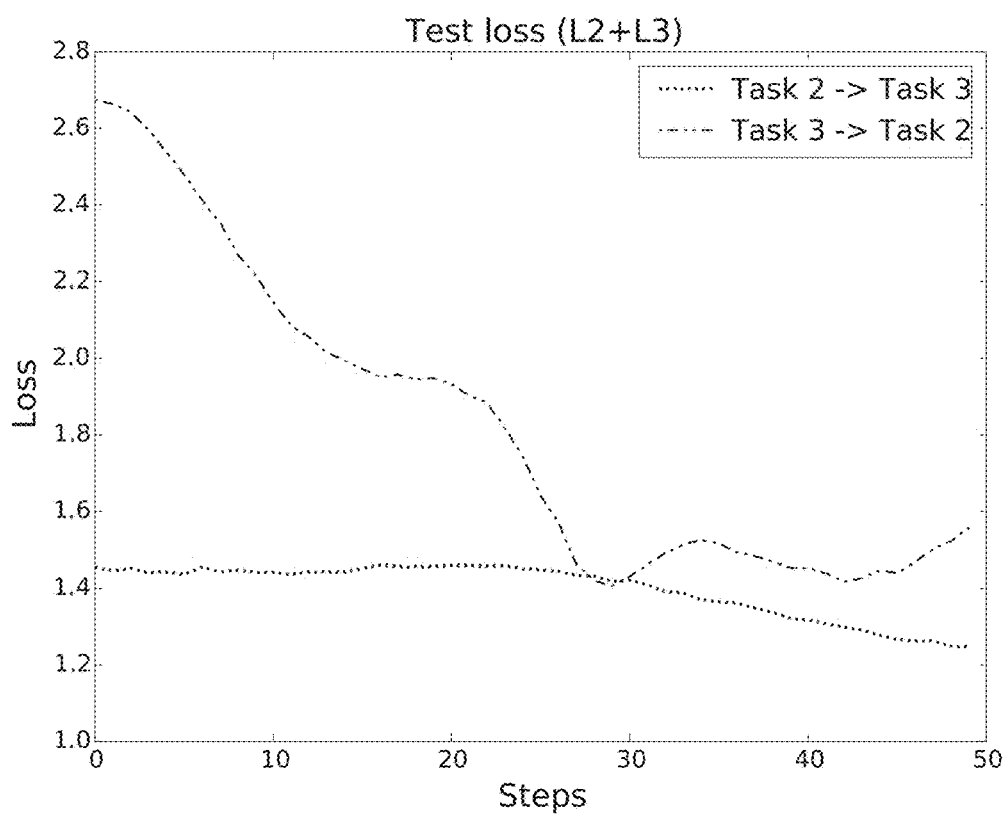
FIG.1B-2

META-LEARNING FOR MULTI-TASK LEARNING FOR NEURAL NETWORKS

CROSS-REFERENCE TO RELATED APPLICATIONS

This application claims the benefit of priority to U.S. Patent Application No. 62/586,154, filed on Nov. 14, 2017, which is entitled "Meta Learning for Multi-Task Learning," which is hereby incorporated by reference herein in its entirety.

BACKGROUND

Field

The present disclosure relates generally to systems and methods for machine learning and more particularly to training machine learning models using meta-learning techniques.

Description of the Related Art

A deep neural network (DNN) is a computation machine learning method. DNNs belong to a class of artificial neural networks (NN). With NNs, a computational graph is constructed which imitates the features of a biological neural network. The biological neural network includes features salient for computation and responsible for many of the capabilities of a biological system that may otherwise be difficult to capture through other methods. In some implementations, such networks are arranged into a sequential layered structure in which connections are unidirectional. For example, outputs of artificial neurons of a particular layer can be connected to inputs of artificial neurons of a subsequent layer. A DNN can be a NN with a large number of layers (e.g., 10 s, 100 s, or more layers).

Different NNs are different from one another in different perspectives. For example, the topologies or architectures (e.g., the number of layers and how the layers are interconnected) and the weights of different NNs can be different. A weight can be approximately analogous to the synaptic strength of a neural connection in a biological system. Weights affect the strength of effect propagated from one layer to another. The output of an artificial neuron can be a nonlinear function of the weighted sum of its inputs. The weights of a NN can be the weights that appear in these summations.

SUMMARY

A meta-learning approach and associated methods and systems are described for automating learning of multiple tasks with a single neural network. The order in which tasks are learned by the neural network can affect performance of the network, and the meta-learning approach can use a task-level curriculum for multi-task training. The task-level curriculum can be learned by monitoring a trajectory of loss functions during training. The meta-learning approach can learn to adapt task loss balancing weights in the course of training to get improved performance on multiple tasks on real world datasets. Advantageously, learning to dynamically balance weights among different task losses can lead to superior performance over the use of static weights determined by expensive random searches or heuristics. Embodiments of the meta-learning approach can be used for computer vision tasks or natural language processing tasks, and the trained neural networks can be used by augmented or virtual reality devices.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

FIGS. 1A-1, 1B-1, and 1C-1 illustrate examples of the balancing weights (alpha 1, alpha 2, and alpha 3) for the corresponding tasks during training. FIGS. 1A-2, 1B-2, and 1C-2 illustrate examples of the total training losses (top figure) and test training losses (bottom figure).

FIG. 2 is a block diagram of an example meta-learning system comprising a meta-network and a child network.

FIG. 3A shows example meta-learning trajectories, FIG. 3B shows examples of converged task weights for the three tasks, and FIGS. 3C-3F show examples of training loss (top figure) and test loss (bottom figure) for the overall task (FIG. 3C) and for each individual task: segmentation (FIG. 3D), depth (FIG. 3E), and surface normal (FIG. 3F).

Figures 1, 1A:
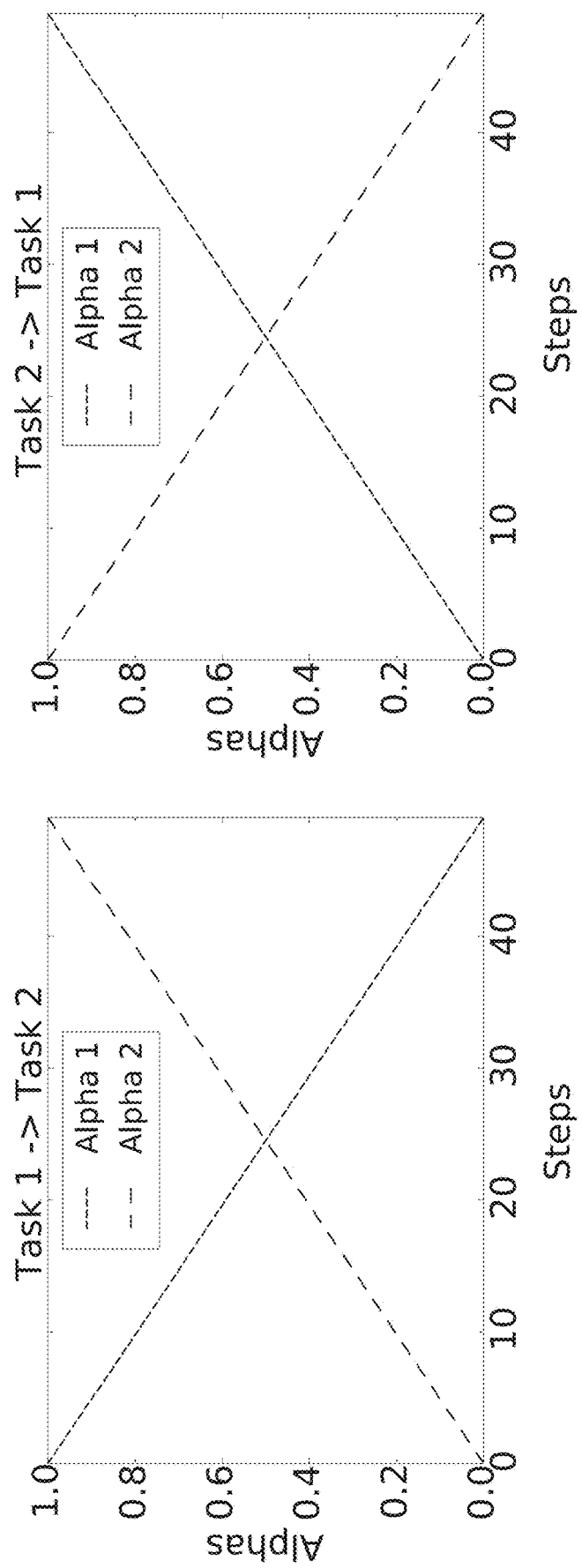
FIGS. 1A-1 to 1C-2 illustrate observations from training multiple tasks in different orders in one deep neural network on the NYUv2 dataset. Tasks 1, 2, and 3 are semantic segmentation, depth prediction, and surface normal estimation, respectively.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

Learning to learn, or meta-learning, may have substantial advantages for training DNNs. Training a DNN for one specific task (e.g., semantic segmentation) may be done through careful design of the network architecture. However, training a single DNN for solving multiple presents challenges. For example, balancing the learning objectives when multiple objectives are present is one such challenge. This multi-objective problem may be made harder when each objective is of a different nature (e.g. cross-entropy, squared loss, cosine loss etc.) and has a varying scale.

In some cases, if the network has been trained with more than one objective function, then the network may be performing multi-task learning. Implicit multi-task learning can be performed in Convolutional Neural Networks (CNNs) such as Fast/Faster R-CNN by jointly optimizing region proposal and final detection objectives. One shot object detector approaches such as YOLO/SSD (You Only Look Once/Single Shot Multibox Detection) further remove region proposal structure and directly predict location and bounding box outputs in one forward pass by optimizing anchor classification losses. These type of models may simultaneously minimize more than one loss function even though the end goal is only a single task.

Some embodiments of implicit or explicit multi-task learning require hand-tuning or grid search for sub-optimal balancing weight (ratios) between different tasks during training. Grid search may involve performing several (usually expensive) iterations of training and this scales poorly with the number of tasks. Furthermore, fixing the balancing weights throughout training generally results in sub-optimal training, since some tasks may need to train earlier than others.

Accordingly, the present disclosure provides various embodiments of a meta-learning approach to automate learning of multiple tasks with a single deep network. A learning objective may be to increase or maximize the learning efficiency of all the tasks and their individual performance. Numerical experiments have shown that the test performance of different tasks can be affected by the order in which the tasks were learned (see, e.g., FIGS. 1A-1C), and hence there may be a need to dynamically balance the multiple objectives throughout the learning iterations to achieve improved or optimal performance. Embodiments of meta-learning can be successfully leveraged for loss balancing and some such embodiments may be superior to statically balancing losses, using heuristics or grid search.

Some embodiments referred to herein train a meta-network to discover a task-level curriculum for jointly training multiple tasks using a single network. Some embodiments are directed to training a meta-network that balances the multiple objectives used to train the multi-task network. Some embodiments of the meta-network learn to balance weights in such a way that some tasks are learned prior to others as in a task-level curriculum manner.

In some embodiments, the meta-network predicts the balancing weights between the losses at each training iteration. By observing the trajectory of these losses, the meta-network may learn to discover a task-level curriculum for jointly training multiple tasks using a single network. A task-level curriculum can correspond to inter-task learning dynamics, for example, some tasks should be learned earlier (e.g., possibly more stable/invariant tasks) than other tasks (e.g., possibly more unstable/variant tasks).

Some embodiments provide learning schedules for different tasks that are difficult based on human intuition or resource heavy when using grid search approaches. The meta-learning approach can be applied to many real world datasets including datasets for computer vision, speech recognition, or natural language processing. As an example, some applications described herein are for computer vision tasks such as scene understanding (e.g., semantic segmentation, depth prediction, or surface normal estimation) in a room layout.

Numerical experiments on jointly training semantic segmentation, depth prediction, and surface normal estimation in one example meta-network demonstrate that the meta-network learns depth first, then gradually focuses on learning surface normal, and finally learns semantic segmentation. This learning order discovered by the meta-network follows a pattern found in the development of the infant visual cortex system.

Applicant has discovered that a task-level curriculum can be advantageous for multi-task learning in some implementations. Embodiments of the meta-network are able to capture this multi-task dynamics in a meta-learning framework and can determine a non-trivial learning schedule for different tasks that cannot be found by using human intuition or exhaustive grid search approaches.

Task-Level Curriculum Learning

One method for training a deep neural network for multiple tasks is to create a hand-designed algorithm/network architecture to automatically learn a set of tasks. However, human experience based or hand-designed tuning of algorithms might not be optimal for certain tasks. One example of a human-designed learning algorithm is curriculum learning. Rather than training on examples in a random order, curriculum learning focuses on re-weighting training examples using a meaningful order based on human-designed difficulty metrics (e.g., the order trains on gradually more examples and gradually more complex examples). Continuation methods include optimization strategies for dealing with minimizing non-convex criteria. These approaches aim to optimize the model with easy training examples first and gradually move towards hard training examples. One basic paradigm is to first optimize a smoothed objective and gradually consider less smoothing, with the intuition that a smooth version of the problem reveals the global picture.

Another example training method, which may be termed task-level curriculum learning, deals with the order in which tasks are learned in a multi-task neural network. These types of methods may use easier tasks to pre-train a sub-network and may train harder tasks on top of the pre-trained sub-network.

Herein, systems and methods to train a meta-network to predict the task-level learning curriculum are described. In some embodiments, the meta-network predicts the balancing weights between the losses at each training iteration. By observing the trajectory of these losses, the meta-network may learn to discover a task-level curriculum for jointly training multiple tasks using a single network. A task-level curriculum can correspond to inter-task learning dynamics, for example, some tasks should be learned earlier (e.g., possibly more stable/invariant tasks) than other tasks (e.g., possibly more unstable/variant tasks).

Training Multiple Tasks in One Network Through Grid Search

One technique that can be used in solving multi-task learning is by finding the optimal balancing weights $\alpha_k$ for K different tasks by using a grid search. Once the weights $\alpha_k$ are selected, the weights can remain as constants throughout the training. In some embodiments, a meta-network may first ascertain whether the order of the tasks being trained matters. To address this, an ablation study was performed by permuting the order of the tasks being trained in one single network in order to determine how the training order affects the learning.

Figures 1, 1A, 2:
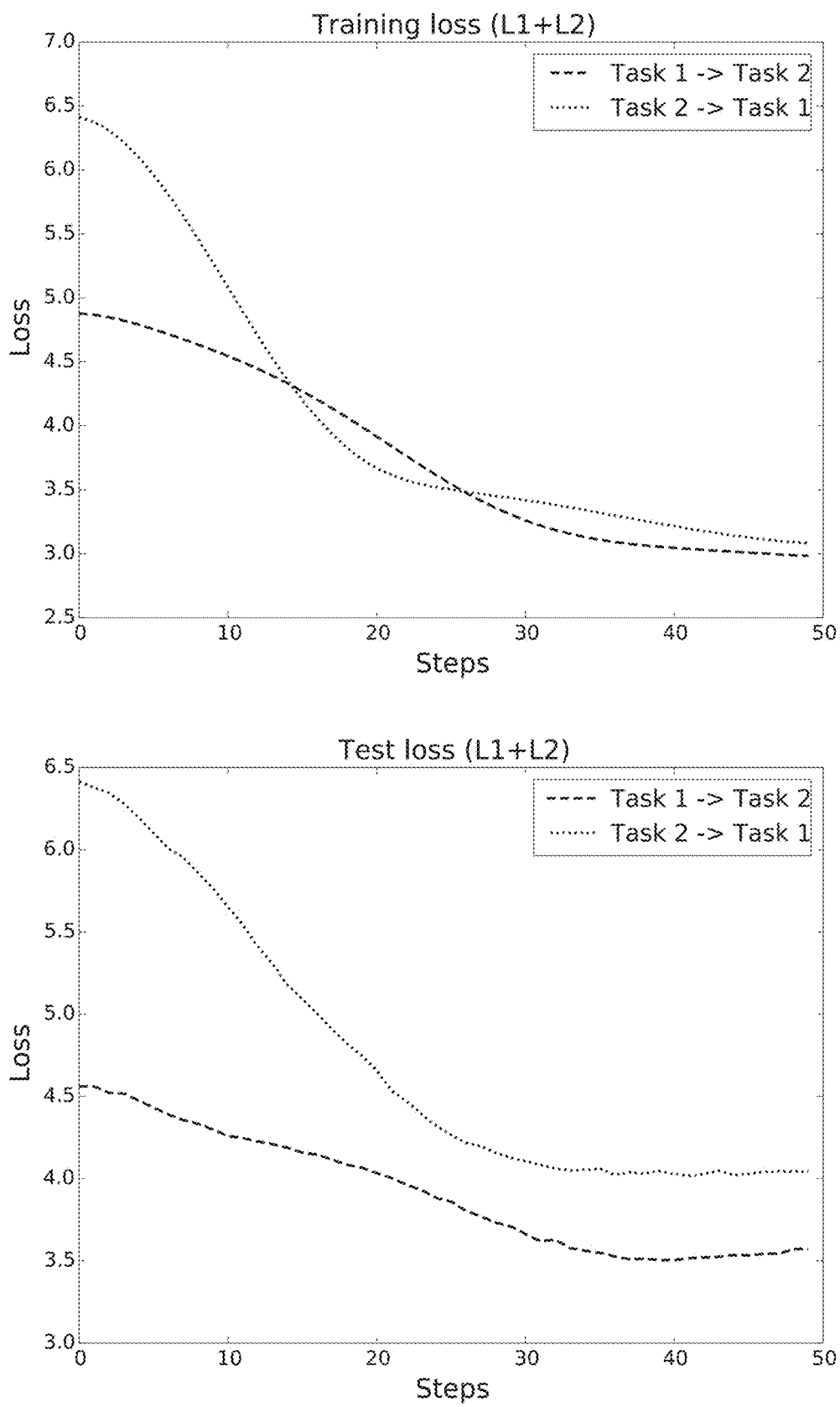
Figures 1, 1B:
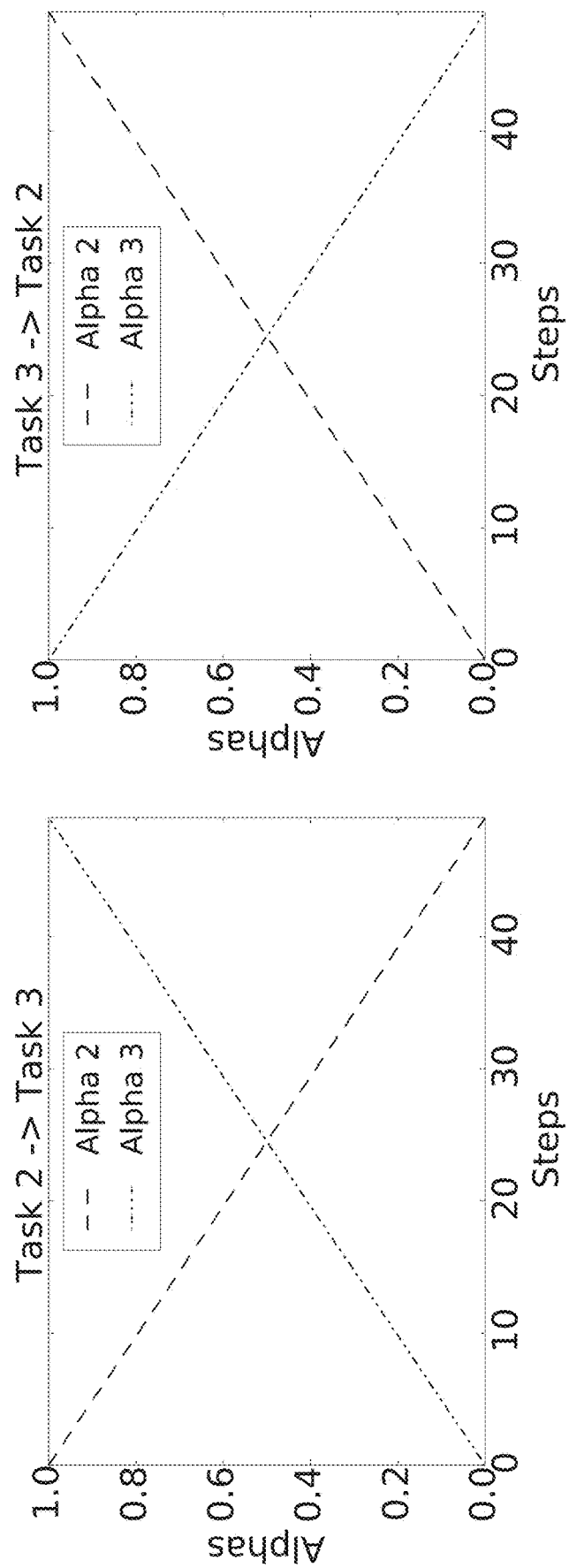
Figure 1C:
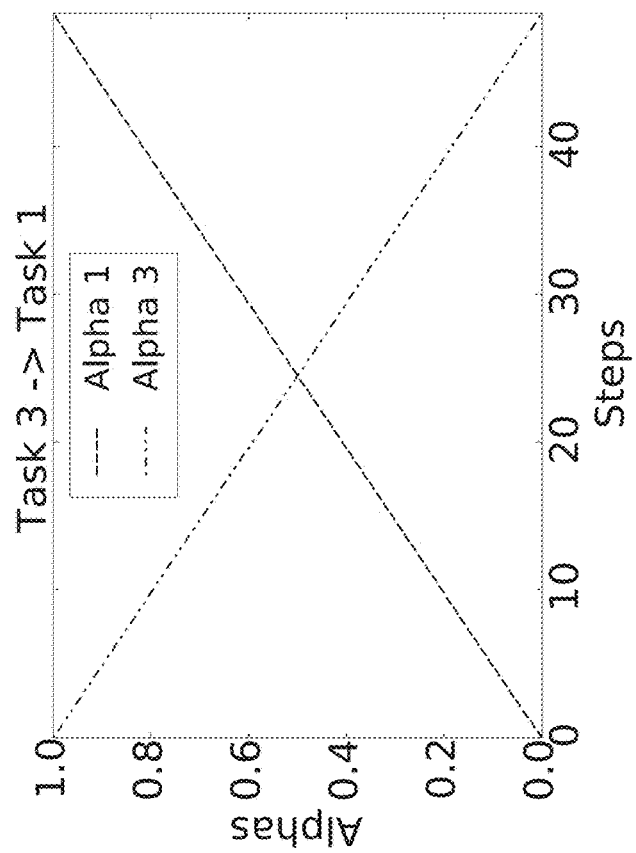
Figure 1:
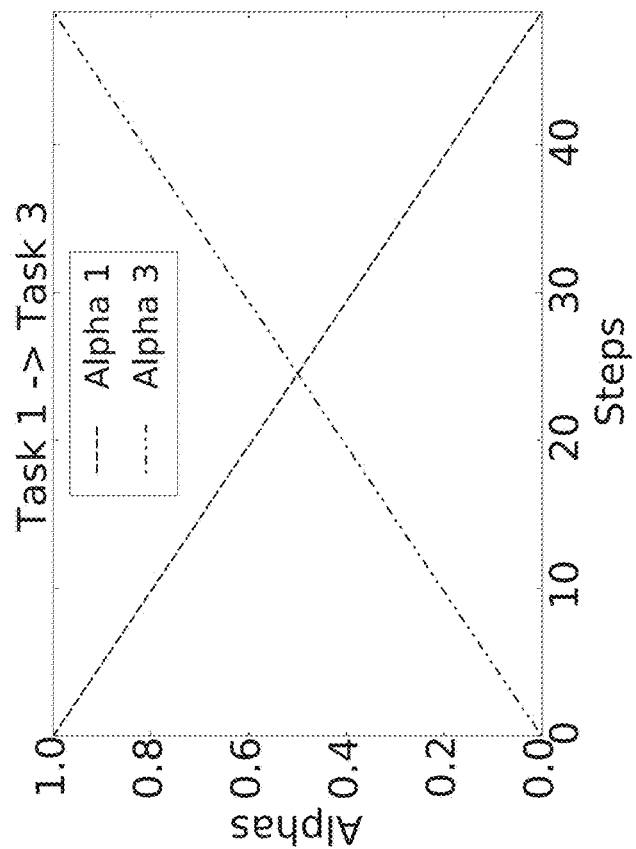
Figures 1, 1C, 2:
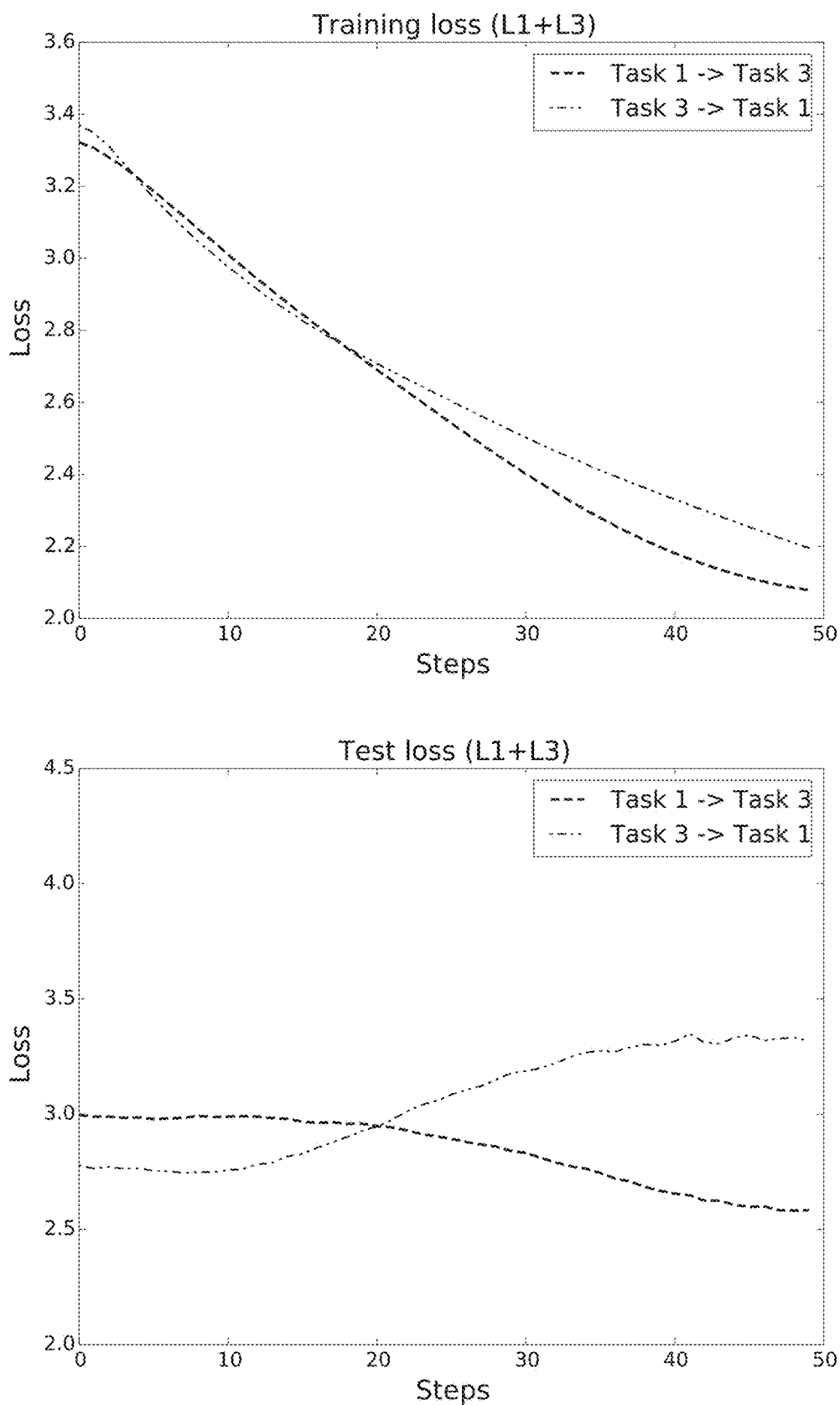
Figure 2:
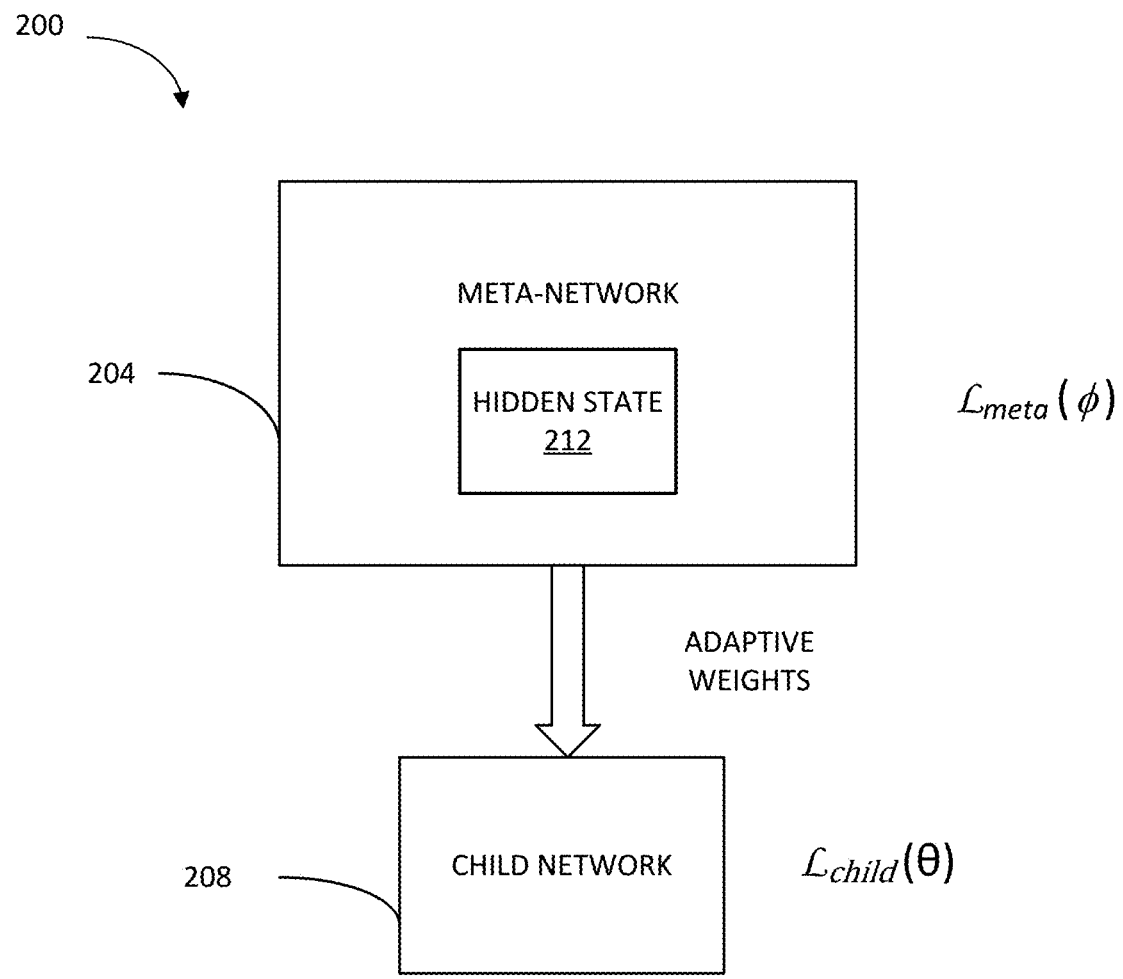

Example observations from training multiple tasks trained in different orders using one deep network are shown in FIGS. 1A-1C. The multiple tasks learned by the deep network are labeled as tasks 1, 2, and 3 and refer to semantic segmentation, depth prediction, and surface normal estimation respectively. The DNN was trained on the NYUv2 dataset (described below).

FIG. 1A-1 shows the balancing weights alpha 1 ($\alpha_1$) and alpha 2 ($\alpha_2$) for corresponding tasks 1 and 2 during training. FIG. 1A-2 shows the total training losses and test losses from training tasks 1 and 2 using the balancing weights depicted in FIG. 1A-1. FIG. 1B-1 shows the balancing weights alpha 2 ($\alpha_2$) and alpha 3 ($\alpha_3$) for corresponding tasks 2 and 3 during training. FIG. 1B-2 shows the total training and test losses from training tasks 2 and 3 using the balancing weights depicted in FIG. 1B-1. FIG. 1C-1 shows the balancing weights alpha 1 ($\alpha_1$) and alpha 3 ($\alpha_3$) for corresponding tasks 1 and 3 during training. FIG. 1C-2 shows the total training and test losses from training tasks 1 and 3 using the balancing weights depicted in FIG. 1C-1.

In FIGS. 1A-1C, the notation "Task i-> Task j" denotes assigning a high value for task i at the start of training with high task i weight $\alpha_i$ and then gradually changing to high task j weight $\alpha_j$. Task weights were constrained to sum to one at every training step. FIGS. 1A-1, 1B-1, and 1C-1 illustrate the change in the weights as a function of the training steps taken during the training.

As depicted in FIGS. 1A-1 and 1A-2, either training from task 1 (segmentation) to task 2 (depth) or from task 2 (depth) to task 1 (segmentation), the network roughly converges to the same training loss value. However, the test loss reveals a dramatically different behavior: training from task 1 gives a much lower overall test loss. This task order specific network training behavior can also be seen in FIGS. 1B-2 and 1C-2. Notice that in these experiments this behavior happens under the same amount of training time, and the task weights are always sum to one at every training step. In other words, each task receives the same amount of training time.

In summary, FIGS. 1A-1C demonstrate example differences between training with different task focuses. For example, for each of FIGS. 1A-2, 1B-2, and 1C-2, the network roughly converges to the same training loss value. However, the test loss reveals a dramatically different behavior, even under the same training time and with the balancing weights summing to one. Accordingly, the test performance of different tasks can be affected by the order in which the tasks were learned during training.

Example Multi-Task Learning by Meta-Learning

In various embodiments multi-task learning is performed in a form of weighed linear sum of the loss functions $\mathcal{L}_k$ for K different tasks with their associated weights $\alpha_k$:

$$\mathcal{L}_{child}(\theta) = \sum_{k=1}^{K} \alpha_k \mathcal{L}_k \quad (1)$$

This example multi-task network is denoted a child network as an introduction to how to use a meta-network to learn such a child network in a meta-learning framework.

In some embodiments of meta-learning, the goal is to perform as well as possible on all K tasks on a training set $\chi$. This goal can be captured by a meta-network objective function $\mathcal{L}_{meta}$ with its parameters $\phi$. An optimal child network parameter $\theta^*(\mathcal{L}_{child}, \phi)$ can be a function of the meta-network parameters $\phi$ and the loss function in question. Given a distribution of loss functions $\mathcal{L}_{child}$ we can then formulate the expected loss as:

$$\mathcal{L}_{meta}(\phi) = \mathbb{E}_{\mathcal{L}_{child}}[\mathcal{L}_{child}(\theta^*(\mathcal{L}_{child}, \phi))], \quad (2)$$

where $\mathbb{E}$ is an expectation operator over the child loss functions.

A meta-network m produces adaptive weights $\alpha$ given the current loss value of the child network and the parameters $\phi$ of the meta-network. The child network therefore can compute updated child network parameters $\theta$ from $\mathcal{L}_{child}$ with this updated set of $\alpha$. In some embodiments, a recurrent model such as a Long Short Term Memory (LSTM) module can be used as the meta-network m with hidden state denoted by h. The output of Equation (2) provides actual learning signals at the end of the training course of the child network; therefore, it may be convenient to have an objective that depends on a trajectory of optimization for a training window of T steps, $$\mathcal{L}_{meta}(\phi) = \mathbb{E}_{\mathcal{L}_{child}}\left[\frac{1}{T}\sum_{t=1}^{T}\mathcal{L}_{child}(\theta_t)\right] \quad (3)$$

where $$\theta_{t+1} = \theta_t + g_t$$

$$g_t = \frac{\partial}{\partial \theta_t}\mathcal{L}_{child}(\theta_t) = \frac{\partial}{\partial \theta_t}\sum_k \alpha_{k,t}\mathcal{L}_k(\theta_t) \quad (4)$$

$$\begin{bmatrix} \alpha_{k,t} \\ h_{t+1} \end{bmatrix} = m(\mathcal{L}_{child}(\theta_t), h_t, \phi)$$

At every training iteration t, the meta-network m produces a new set of balancing weights $\alpha_{k,t}$ given the up-to-date learning trajectory $\mathcal{L}_{child}(\theta_t)$ and the LSTM hidden state $h_t$.

In some embodiments, the value of the meta-network loss function $\mathcal{L}_{meta}(\phi)$ can be reduced or minimized using gradient descent on $\phi$. Instead of searching for the optimal $\alpha_k$ by human intuition or a heuristic, some embodiments can reduce or minimize this meta-learning objective with respect to $\phi$ as learning the relative relationship of the losses $\mathcal{L}_k$ in a data-driven fashion. The meta-network may consume many optimization curves and learn to adjust its parameters to produce optimal relationship coefficients $\alpha$ between all tasks dynamically. This approach differs from directly optimizing $\mathcal{L}_{child}$ with respect to the weights $\alpha$ because the objective function $\mathcal{L}_{child}$ has no access to the history of the training trajectories and can only allow the optimizer to find the best weights $\alpha$ based on the current objective value.

FIG. 2 is a block diagram of an example meta-learning system 200 comprising a meta-network 204 and a child network 208. As described with reference to Equations (1) to (4), a meta-network loss function $\mathcal{L}_{meta}(\phi)$ can depend on the parameters $\phi$ of the meta-network, and a child network loss function $\mathcal{L}_{child}(\theta_t)$ can depend on parameters $\theta$ of the child network, which can optionally depend on the training iteration t. The value of the meta-network loss function can be reduced or minimized to provide a set of adaptive weights for the child network. If the child network comprises a multi-task network, the adaptive weights can be the weights for each of the tasks $\alpha$. In some embodiments, the meta-network can include a hidden state 212. The meta-network 204 can comprise a recurrent model such as a Long Short Term Memory (LSTM) module. The child network therefore can compute updated child network parameters $\theta$ from its loss function $\mathcal{L}_{child}$ with this updated set of adaptive weights. As described above, the meta-learning system 200 can iterate over an optimization trajectory to minimize the loss functions.

Example Meta-Learning Problem and Meta-Network

One of the most common and natural multi-task learning problems in computer vision is to capture scene geometry and recognize objects in the scene. Object recognition has a wide array of applications such as real-time three-dimensional (3D) reconstruction for augmented reality and for inferring support-relationships among objects to autonomous driving.

An embodiment of the meta-learning techniques described with respect to Equations (1) to (4) was applied on a real-world scene understanding dataset NYUv2. The NYUv2 dataset includes 1449 densely labeled pairs of aligned color (RGB) and depth images in indoor scenes at 640×480 resolution. The child-network and the meta-network was trained on 795 training examples, and test results were calculated on 654 separate test examples. In the numerical experiments, the images were downsampled to a 128×128 resolution to reduce the computational burden.

The NYUv2 dataset comes with three task suites: semantic segmentation, depth prediction, and surface normal estimation, which are good candidate tasks for a multi-task meta-learning scenario.

Semantic segmentation includes understanding an image at the pixel level. Meta-learning was evaluated on semantic class sets with 13 semantic labels described in the NYUv2 dataset. A cross-entropy loss function was used for semantic segmentation to learn pixel-wise class probabilities and to report test set accuracies using a mean of intersection over union (mIoU) metric.

For depth prediction, an L1 loss function was used to perform pixel-wise supervised depth regression training for depth prediction. In the numerical experiments, depths were measured in meters (from 0 to 10 meters) for training and testing, where the ground truth depths were captured from an RGBD sensor.

For surface normal training, pixel-wise cosine distance (e.g., 1−|cos θ|) was used, where θ measures the angle between the ground truth surface normal vector and the predicted surface normal vector. Each surface normal vector includes three components, representing x, y, and z directions. The NYUv2 toolbox was used to generate the surface normal ground truth from the depth ground truth and the camera parameters.

In the numerical experiments, the meta-network architecture utilized two-layer LSTMs with 20 hidden units in each layer. The output of the meta-network went through a softmax function to ensure the generated weights $\alpha_k$ sum to one and are greater than zero. The meta-network was trained by minimizing Equation (3) by backpropagation through time (BPTT) using the ADAM optimization algorithm (adaptive moment estimation) with a learning rate of 0.001. In the experiments, gradient clipping at a norm value of 1 was utilized to improve the training. The method was found to be relatively insensitive to the number of hidden units (20), which were held constant throughout the experiments.

In the experiments, the multi-task child network was a deep fully-convolutional network that includes six 3×3 convolutional layers with stride 1 except for the first two convolutional layers which used a stride of 2. Each convolutional layer had 16 filters with all non-linearities being rectified linear unit (ReLU) activations followed by batch normalization. At each training step, the meta-network generated a new set of task balancing weights $\alpha_k$ for all 3 tasks that were trained. The child network uses these adaptive weights to compute the gradient with respect to its own child network parameters θ. The child network was trained with standard stochastic gradient descent with momentum of 0.9, learning rate of 0.01, and batch size of 10. All parameters were initialized with an i.i.d. Gaussian distribution.

The results from the meta-learning meta-network were compared with two commonly used multi-task learning techniques: equal weighting and grid search. The equal weighting technique used the same a values of 0.333 for all three tasks. For grid search, a step size of 0.02 from the search space for each $\alpha_k$ was used with the constraints that the weights sum to one and are all positive. The best results from 1200 grid search runs are summarized in FIGS. 3A-3F and Table 1.

Figure 3A:
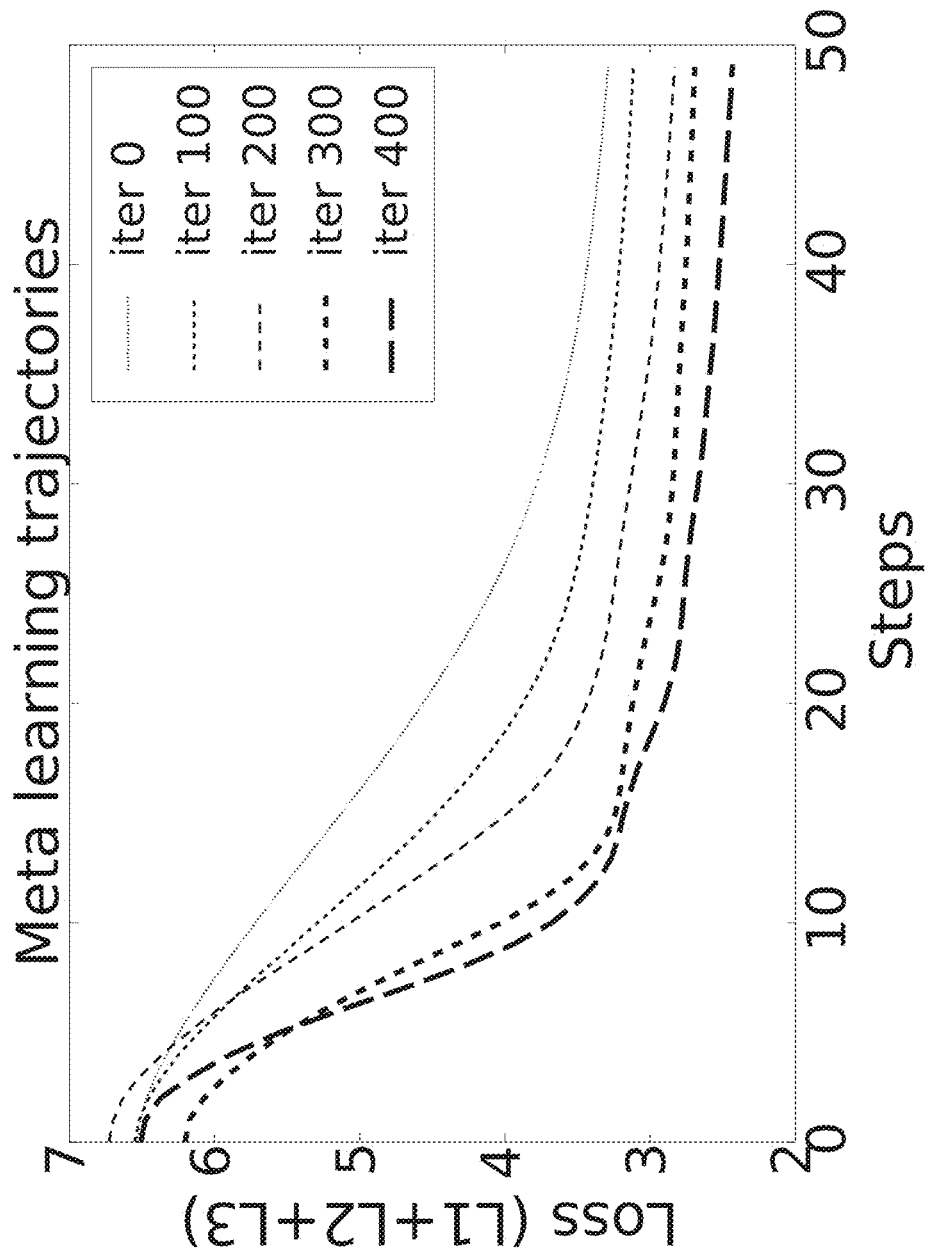
FIGS. 3A-3F illustrate examples of numerical results comparing performance of an embodiment of the meta-learning meta-network with grid search and equal weights multi-task learning. The three tasks are computer vision tasks for scene understanding: segmentation, depth, and surface normal.
Figure 3B:
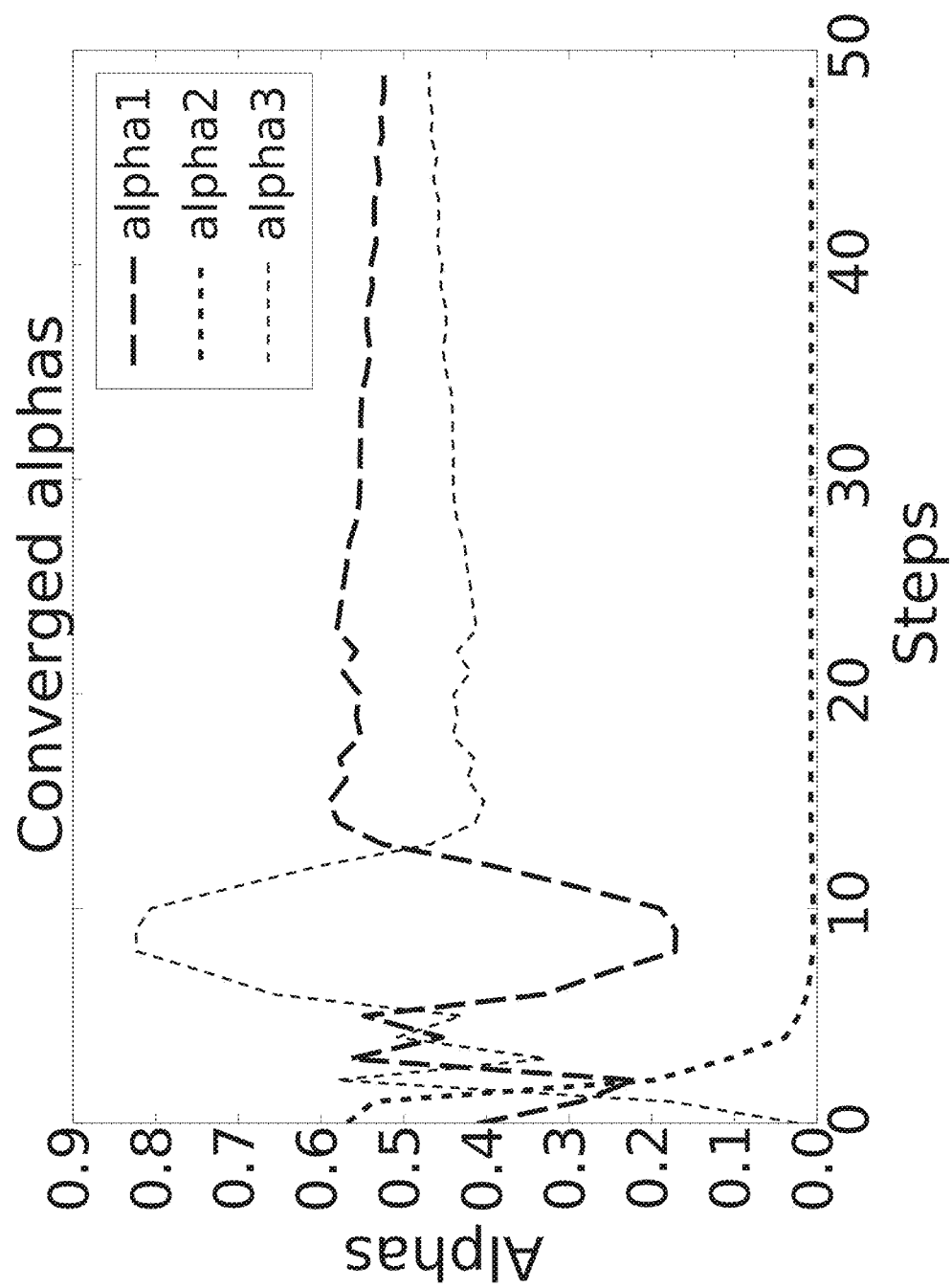

FIG. 3A shows an example of the learning trajectories of an example meta-network learning how to learn a set of three tasks: semantic segmentation (task 1), depth detection (task 2), and surface normal estimation (task 3). FIG. 3A shows the convergence of the learning trajectory to a certain loss value for 0, 100, 200, 300, and 400 training iterations. FIG. 3B shows the final converged task weight values a for the three tasks for one learning trajectory of the example meta-network.

Figure 3C:
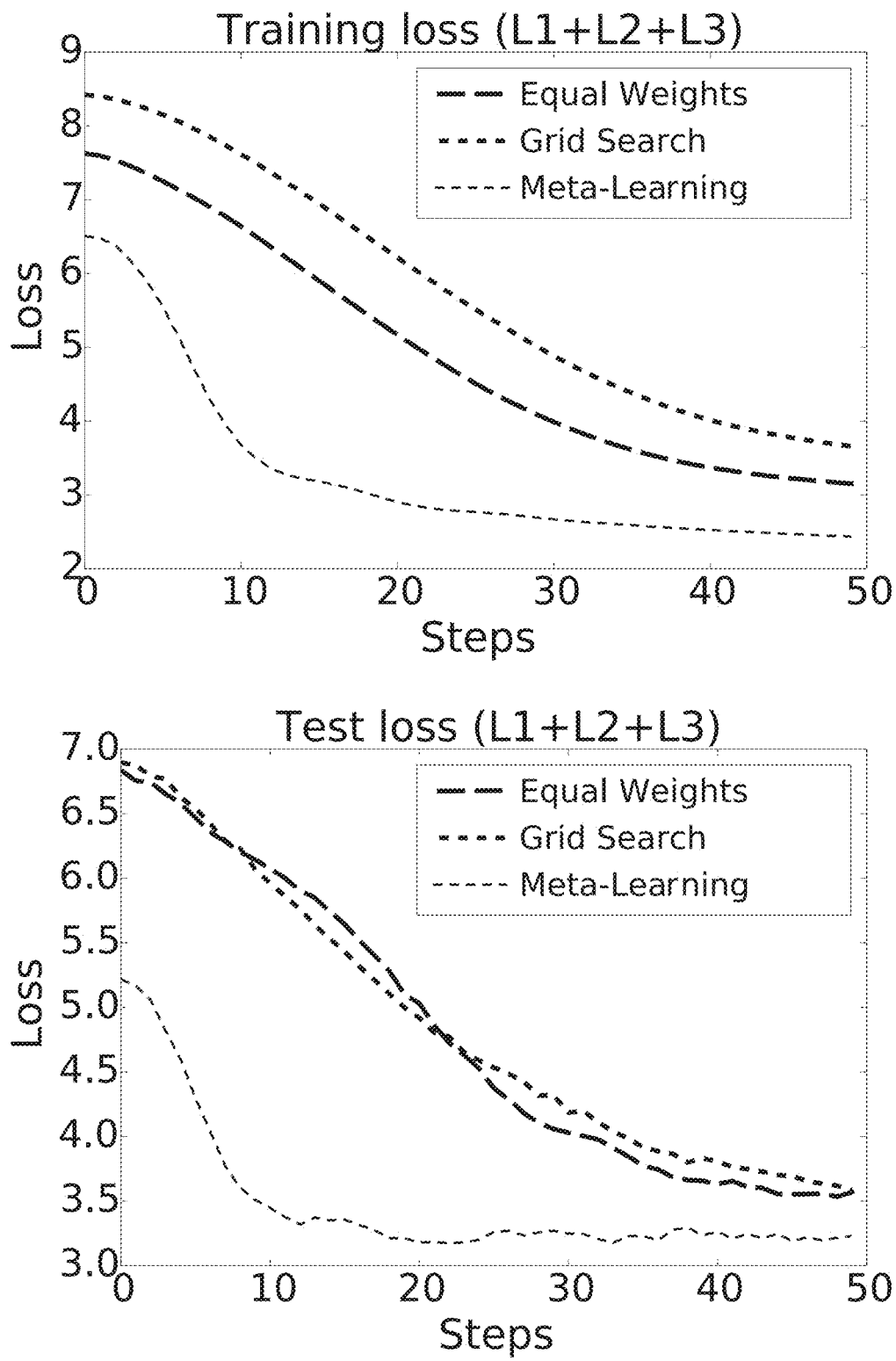
Figure 3D:
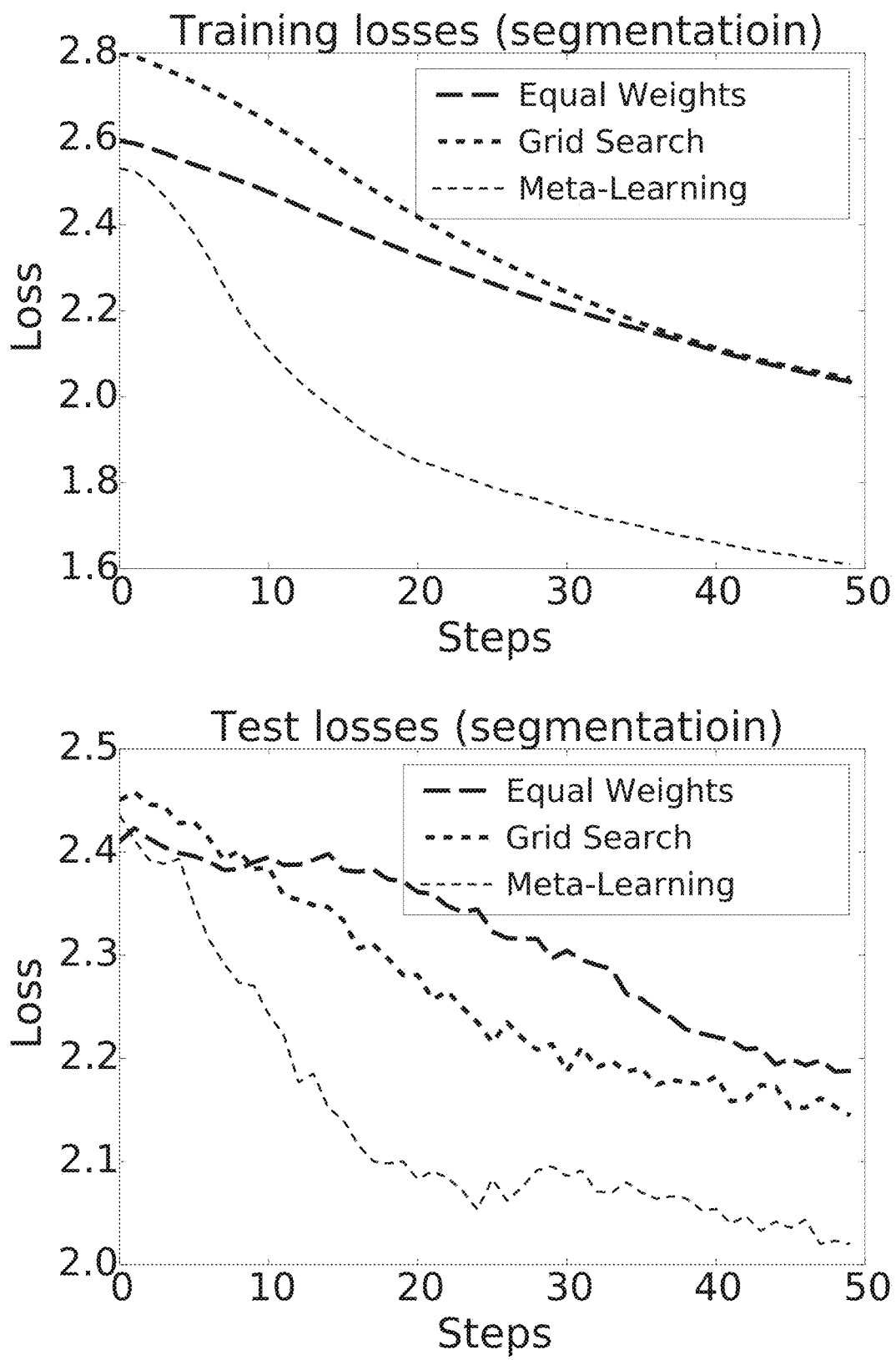
Figure 3E:
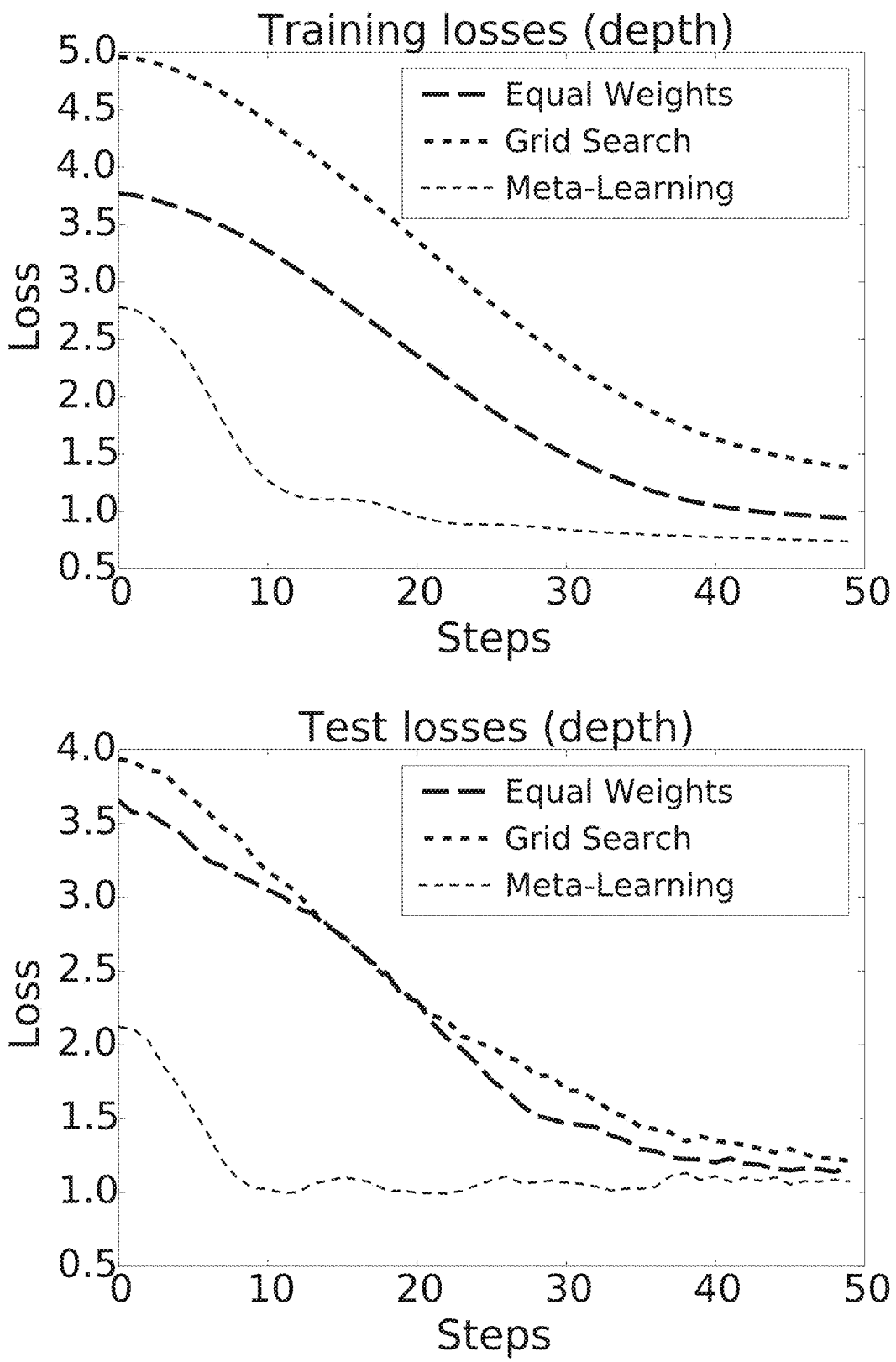
Figure 3F:
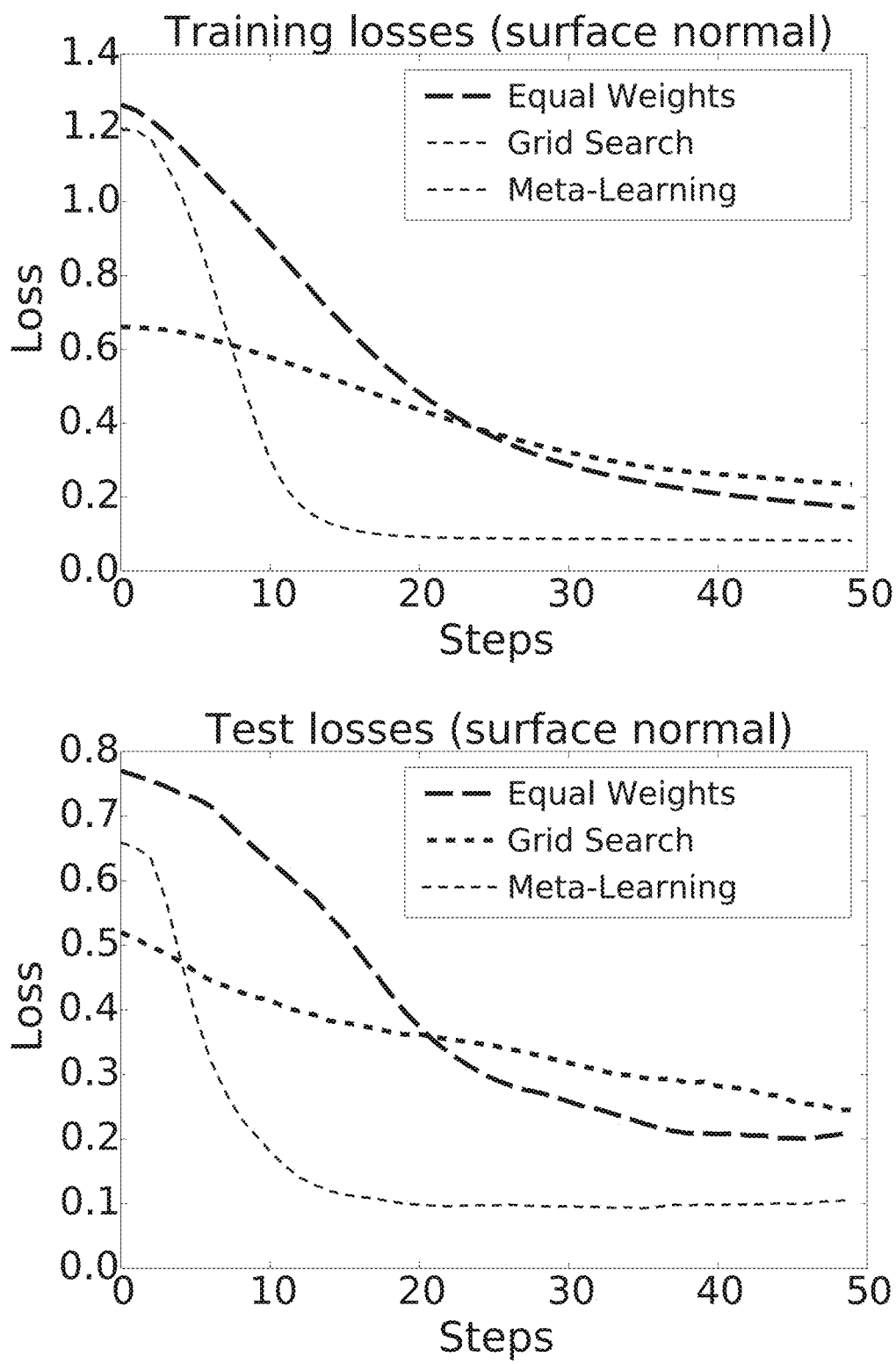

FIGS. 3C-3F show a comparison between multi-task learning controlled by equal weighting, grid search, and an embodiment of the meta-learning meta-network on the NYUv2 dataset for learning how to learn semantic segmentation (task 1), depth detection (task 2), and surface normal estimation (task 3). FIG. 3C illustrates the overall training loss and test loss for all three tasks. FIGS. 3D, 3E, 3F illustrate the training loss and the test loss for each individual task: segmentation (FIG. 3D), depth (FIG. 3E), and surface normal (FIG. 3F).

The meta-network embodiment dynamically adjusts the balancing weights $\alpha$ for the different tasks throughout the course of the training and results in a better convergence rate and lower test losses as compared to the equal weighting and grid search approaches.

Table 1 shows a summary of comparative experimental results for the meta-learning technique described herein compared with equal weighting and grid search. Table 1 also shows a comparison with a recently developed uncertainty weighting approach that computes homoscedastic uncertainty of the output from each task based on a Gaussian likelihood assumption and learns the uncertainty task balancing weighting jointly with the original task objectives.

TABLE 1

| Loss | Task Weights | | | Segmentation mIoU (%) | Depth Error (m) | Surface Normal Error (1 − \|cosθ\|) |
| --- | --- | --- | --- | --- | --- | --- |
| | Seg. | Depth | Normal | | | |
| Segmentation only | 1 | 0 | 0 | 5.37 | — | — |
| Depth only | 0 | 1 | 0 | — | 1.558 | — |
| Surface normal only | 0 | 0 | 1 | — | — | 0.109 |
| Equal weight | 0.333 | 0.333 | 0.333 | 3.77 | 1.171 | 0.209 |
| Grid search optimal | 0.46 | 0.38 | 0.16 | 5.22 | 1.211 | 0.235 |
| Uncertainty weighting | ✓ | ✓ | ✓ | 5.36 | 1.127 | 0.210 |
| Meta-learning | ✓ | ✓ | ✓ | 6.52 | 1.074 | 0.106 |

As can be seen from Table 1, training performance can be improved when training with an embodiment of the meta-learning multi-task learning techniques (see, e.g., Eqs. (1) to (4)), over single-task models, weighted losses, grid search, and uncertainty weighting.

Example Meta-Learning Process for Multi-Task Learning

Figure 4:
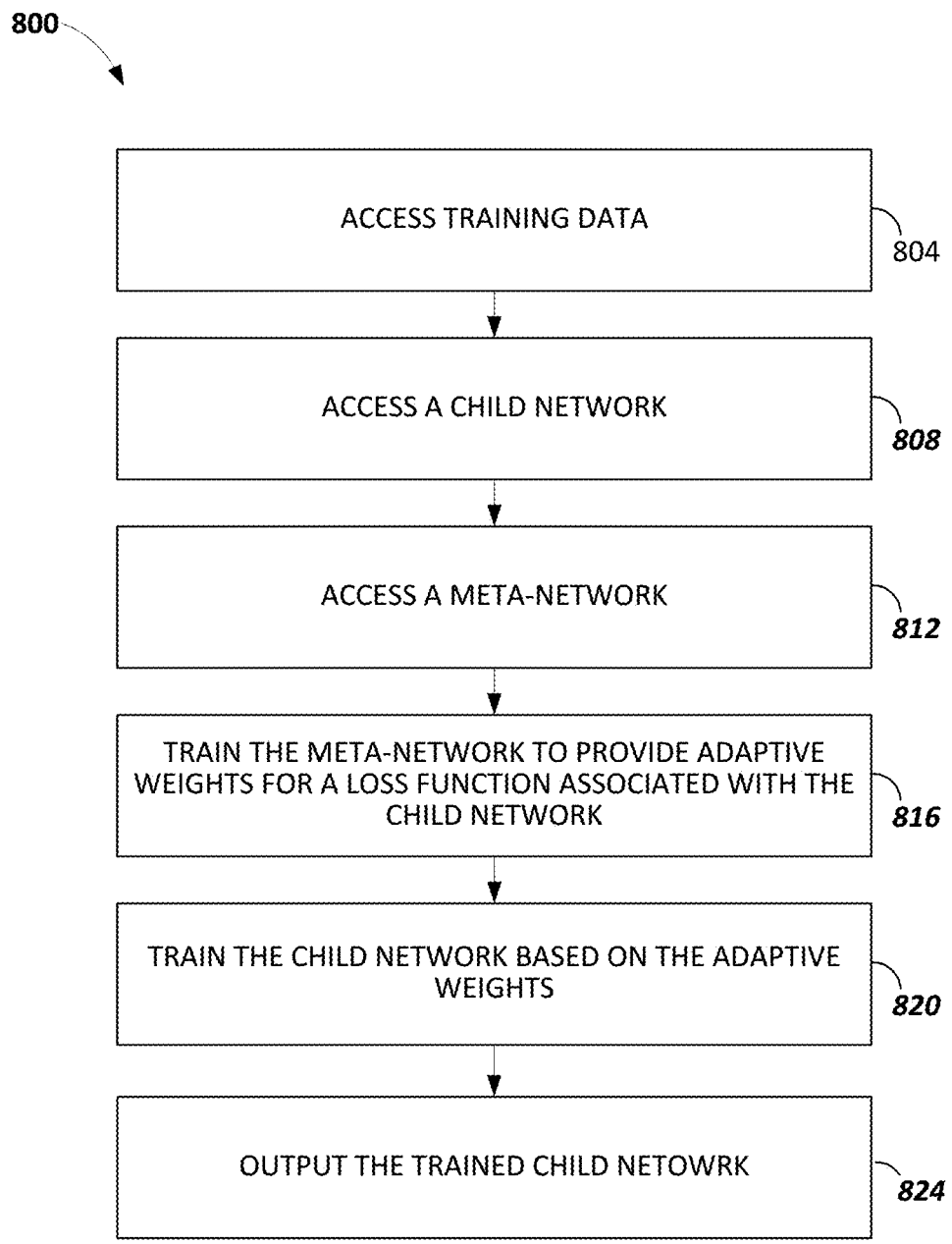
FIG. 4 is a flow diagram of an example process for meta-learning for multi-task learning.

FIG. 4 is a flow diagram of an example process 800 for training a child network using meta-learning and a meta-network. The child network can comprise a multi-task network used for determining outputs associated with a plurality of tasks (e.g., scene understanding). The child network can comprise a plurality of shared layers and an output layer comprising a plurality of task specific filters. A computing system, such as a computing system with non-transitory memory and a hardware processor, can perform the process 800 to train the child network. The non-transitory memory of the computing system can store, or be configured to store, executable instructions. The hardware processor can be in communication with the non-transitory memory and programmed by the executable instructions to perform the process 800 to train the child network using an embodiment of meta-learning.

At block 804, the process 800 accesses training data. The training data can comprise training images associated with a plurality of reference task outputs for the child network. The plurality of tasks can comprise a regression task, a classification task, or a combination thereof. The plurality of tasks can comprise, for example, a perception task, such as the face recognition, visual search, gesture identification or recognition, scene understanding, semantic segmentation, depth estimation, surface normal estimation, object detection, room layout estimation, cuboid detection, lighting detection, simultaneous localization and mapping, relocalization of an object or an avatar, or speech processing tasks such as speech recognition or natural language processing, or a combination thereof.

At block 808, the process 800 accesses a child network. The child network may be a multi-task neural network. The child network can be associated with a child network loss function that can depend on parameters θ of the child network. For example, the child network loss function $\mathcal{L}_{child}(\theta_t)$ can comprise a weighted linear combination of losses $\mathcal{L}_4$ for K different tasks with their associated weights $\alpha_k$ (see, e.g., Eq. (1)). The child network parameters θ can depend on a training iteration time t.

At block 812, the process 800 accesses a meta-network. The meta-network can be associated with a meta-network loss function $\mathcal{L}_{meta}(\phi)$ that can depend on the parameters φ of the meta-network. In various embodiments, the meta-network loss function can be formulated as described above with reference to Equations (2) or (3).

At block 816, the process 800 trains the meta-network to provide adaptive weights for the child loss function. The adaptive weights can be the weights $\alpha_k$ associated with the tasks of a multi-task child network. The trained meta-network thereby produces adaptive weights α given the current loss value of the child network and the parameters φ of the meta-network. The meta-network can comprise a recurrent model such as, e.g., a long short term memory (LSTM) module. The meta-network can be trained by stochastic gradient descent or by backpropagation through time (BPTT) using an embodiment of the ADAM optimization algorithm (e.g., adaptive moment estimation). The process 800 can train the meta-network based on a trajectory of optimization for a training window of T steps using Equations (3) and (4). In some such embodiments, at every training iteration t, the meta-network produces a new set of balancing weights given the up-to-date learning trajectory of the child $\mathcal{L}_{child}(\theta_t)$ and a hidden state $h_t$ of the meta-network.

At block 820, the process 800 trains the child network based on the adaptive weights learned at block 816. For example, the child network can use these adaptive weights to compute the gradient with respect to its own child network parameters θ, e.g., via stochastic gradient descent. Blocks 816 and 820 can be iterated until sufficient convergence is achieved.

At block 824, the process 800 outputs the trained child network. The trained child network can be stored in memory of an AR, VR, or MR display device and used to perform tasks associated with the child network (see, e.g., the description associated with the wearable system described with reference to FIG. 5).

Example NN Layers

Models representing data relationships and patterns, such as functions, algorithms, systems, and the like, may accept input, and produce output that corresponds to the input in some way. For example, a model may be implemented as a machine learning method such as a convolutional neural network (CNN) or a deep neural network (DNN). Deep learning is part of a broader family of machine learning methods based on the idea of learning data representations as opposed to task specific methods and shows promise in solving audio-visual computational problems useful for augmented reality (AR), mixed reality (MR), virtual reality (VR), and machine intelligence. In machine learning, a convolutional neural network (CNN or ConvNet) can include a class of deep, feed-forward artificial neural networks, and CNNs have successfully been applied to analyzing visual imagery. Machine learning methods include a family of methods that can enable robust and accurate solutions to a wide variety of problems, including eye image segmentation or eye tracking.

A layer of a neural network (NN), such as a deep neural network (DNN) can apply a linear or non-linear transformation to its input to generate its output. A deep neural network layer can be a normalization layer, a convolutional layer, a softsign layer, a rectified linear layer, a concatenation layer, a pooling layer, a recurrent layer, an inception-like layer, or any combination thereof. The normalization layer can normalize the brightness of its input to generate its output with, for example, L2 normalization. The normalization layer can, for example, normalize the brightness of a plurality of images with respect to one another at once to generate a plurality of normalized images as its output. Non-limiting examples of methods for normalizing brightness include local contrast normalization (LCN) or local response normalization (LRN). Local contrast normalization can normalize the contrast of an image non-linearly by normalizing local regions of the image on a per pixel basis to have a mean of zero and a variance of one (or other values of mean and variance). Local response normalization can normalize an image over local input regions to have a mean of zero and a variance of one (or other values of mean and variance). The normalization layer may speed up the training process.

The convolutional layer can apply a set of kernels that convolve its input to generate its output. The softsign layer can apply a softsign function to its input. The softsign function (softsign(x)) can be, for example, (x/(1+|x|)). The softsign layer may neglect impact of per-element outliers. The rectified linear layer can be a rectified linear layer unit (ReLU) or a parameterized rectified linear layer unit (PReLU). The ReLU layer can apply a ReLU function to its input to generate its output. The ReLU function ReLU(x) can be, for example, max(0, x). The PReLU layer can apply a PReLU function to its input to generate its output. The PReLU function PReLU(x) can be, for example, x if x≥0 and ax if x<0, where a is a positive number. The concatenation layer can concatenate its input to generate its output. For example, the concatenation layer can concatenate four 5×5 images to generate one 20×20 image. The pooling layer can apply a pooling function which down samples its input to generate its output. For example, the pooling layer can down sample a 20×20 image into a 10×10 image. Non-limiting examples of the pooling function include maximum pooling, average pooling, or minimum pooling.

At a time point t, the recurrent layer can compute a hidden state s(t), and a recurrent connection can provide the hidden state s(t) at time t to the recurrent layer as an input at a subsequent time point t+1. The recurrent layer can compute its output at time t+1 based on the hidden state s(t) at time t. For example, the recurrent layer can apply the softsign function to the hidden state s(t) at time t to compute its output at time t+1. The hidden state of the recurrent layer at time t+1 has as its input the hidden state s(t) of the recurrent layer at time t. The recurrent layer can compute the hidden state s(t+1) by applying, for example, a ReLU function to its input. The inception-like layer can include one or more of the normalization layer, the convolutional layer, the softsign layer, the rectified linear layer such as the ReLU layer and the PReLU layer, the concatenation layer, the pooling layer, or any combination thereof.

The number of layers in the NN can be different in different implementations. For example, the number of layers in the DNN can be 50, 100, 200, or more. The input type of a deep neural network layer can be different in different implementations. For example, a layer can receive the outputs of a number of layers as its input. The input of a layer can include the outputs of five layers. As another example, the input of a layer can include 1% of the layers of the NN. The output of a layer can be the inputs of a number of layers. For example, the output of a layer can be used as the inputs of five layers. As another example, the output of a layer can be used as the inputs of 1% of the layers of the NN.

The input size or the output size of a layer can be quite large. The input size or the output size of a layer can be n×m, where n denotes the width and m denotes the height of the input or the output. For example, n or m can be 11, 21, 31, or more. The channel sizes of the input or the output of a layer can be different in different implementations. For example, the channel size of the input or the output of a layer can be 4, 16, 32, 64, 128, or more. The kernel size of a layer can be different in different implementations. For example, the kernel size can be n×m, where n denotes the width and m denotes the height of the kernel. For example, n or m can be 5, 7, 9, or more. The stride size of a layer can be different in different implementations. For example, the stride size of a deep neural network layer can be 3, 5, 7 or more.

In some embodiments, a NN can refer to a plurality of NNs that together compute an output of the NN. Different NNs of the plurality of NNs can be trained for different tasks. A processor (e.g., a processor of the local data processing module 924 described with reference to FIG. 5) can compute outputs of NNs of the plurality of NNs to determine an output of the NN. For example, an output of a NN of the plurality of NNs can include a likelihood score. The processor can determine the output of the NN including the plurality of NNs based on the likelihood scores of the outputs of different NNs of the plurality of NNs.

Example Wearable Display System

In some embodiments, a user device can be, or can be included, in a wearable display device, which may advantageously provide a more immersive virtual reality (VR), augmented reality (AR), or mixed reality (MR) experience, where digitally reproduced images or portions thereof are presented to a wearer in a manner wherein they seem to be, or may be perceived as, real.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. For example, displays containing a stack of waveguides may be configured to be worn positioned in front of the eyes of a user, or viewer. The stack of waveguides may be utilized to provide three-dimensional perception to the eye/brain by using a plurality of waveguides to direct light from an image injection device (e.g., discrete displays or output ends of a multiplexed display which pipe image information via one or more optical fibers) to the viewer's eye at particular angles (and amounts of divergence) corresponding to the depth plane associated with a particular waveguide.

In some embodiments, two stacks of waveguides, one for each eye of a viewer, may be utilized to provide different images to each eye. As one example, an augmented reality scene may be such that a wearer of an AR technology sees a real-world park-like setting featuring people, trees, buildings in the background, and a concrete platform. In addition to these items, the wearer of the AR technology may also perceive that he "sees" a robot statue standing upon the real-world platform, and a cartoon-like avatar character flying by which seems to be a personification of a bumble bee, even though the robot statue and the bumble bee do not exist in the real world. The stack(s) of waveguides may be used to generate a light field corresponding to an input image and in some implementations, the wearable display comprises a wearable light field display. Examples of wearable display device and waveguide stacks for providing light field images are described in U.S. Patent Publication No. 2015/0016777, which is hereby incorporated by reference herein in its entirety for all it contains.

Figure 5:
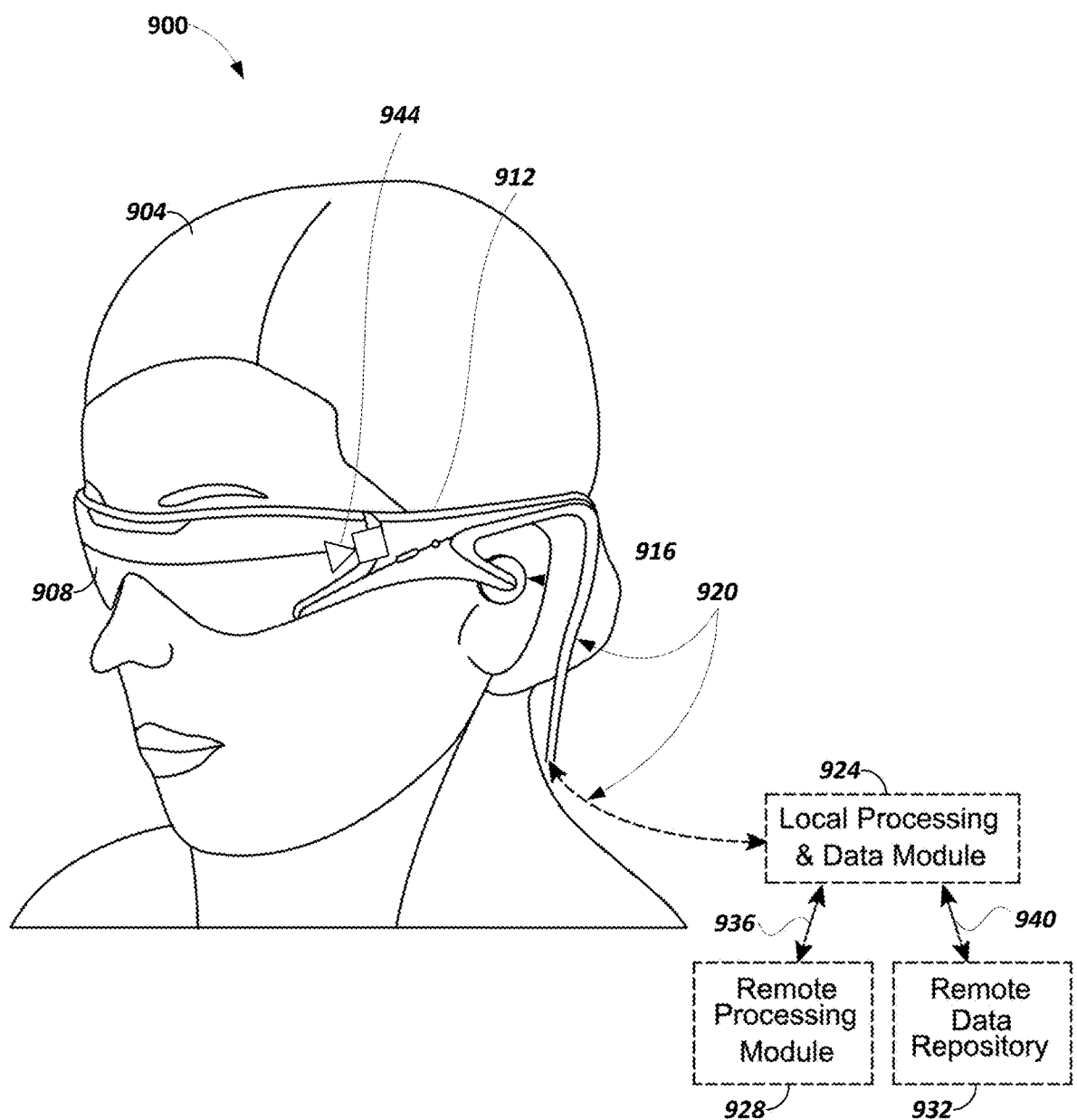
FIG. 5 schematically illustrates an example of a wearable display system, which can implement an embodiment of the multitask network trained with the meta-learning techniques described herein.

FIG. 5 illustrates an example of a wearable display system 900 that can be used to present a VR, AR, or MR experience to a display system wearer or viewer 904. The wearable display system 900 may be programmed to perform any of the applications or embodiments described herein (e.g., executing CNNs or DNNs, reordering values of input activation maps or kernels, eye image segmentation, or eye tracking). The display system 900 includes a display 908, and various mechanical and electronic modules and systems to support the functioning of that display 908. The display 908 may be coupled to a frame 912, which is wearable by the display system wearer or viewer 904 and which is configured to position the display 908 in front of the eyes of the wearer 904. The display 908 may be a light field display. In some embodiments, a speaker 916 is coupled to the frame 912 and positioned adjacent the ear canal of the user in some embodiments, another speaker, not shown, is positioned adjacent the other ear canal of the user to provide for stereo/shapeable sound control. The display system 900 can include an outward-facing imaging system 944 (e.g., one or more cameras) that can obtain images (e.g., still images or video) of the environment around the wearer 904. Images obtained by the outward-facing imaging system 944 can be analyzed by embodiments of the multitask network trained by the meta-learning method 900 described with reference to FIGS. 2 and 4 in the environment around the wearer 904.

The display 908 is operatively coupled 920, such as by a wired lead or wireless connectivity, to a local data processing module 924 which may be mounted in a variety of configurations, such as fixedly attached to the frame 912, fixedly attached to a helmet or hat worn by the user, embedded in headphones, or otherwise removably attached to the user 904 (e.g., in a backpack-style configuration, in a belt-coupling style configuration).

The local processing and data module 924 may comprise a hardware processor, as well as non-transitory digital memory, such as non-volatile memory e.g., flash memory, both of which may be utilized to assist in the processing, caching, and storage of data. The data include data (a) captured from sensors (which may be, e.g., operatively coupled to the frame 912 or otherwise attached to the wearer 904), such as image capture devices (such as cameras), microphones, inertial measurement units, accelerometers, compasses, GPS units, radio devices, and/or gyros; and/or (b) acquired and/or processed using remote processing module 928 and/or remote data repository 932, possibly for passage to the display 908 after such processing or retrieval. The local processing and data module 924 may be operatively coupled to the remote processing module 928 and remote data repository 932 by communication links 936, 940, such as via a wired or wireless communication links, such that these remote modules 928, 932 are operatively coupled to each other and available as resources to the local processing and data module 924. The image capture device(s) can be used to capture the eye images used in the eye image segmentation, or eye tracking procedures.

In some embodiments, the remote processing module 928 may comprise one or more processors configured to analyze and process data and/or image information such as video information captured by an image capture device. The video data may be stored locally in the local processing and data module 924 and/or in the remote data repository 932. In some embodiments, the remote data repository 932 may comprise a digital data storage facility, which may be available through the internet or other networking configuration in a "cloud" resource configuration. In some embodiments, all data is stored and all computations are performed in the local processing and data module 924, allowing fully autonomous use from a remote module.

In some implementations, the local processing and data module 924 and/or the remote processing module 928 are programmed to perform embodiments of reordering values of input activation maps or kernels, eye image segmentation, or eye tracking disclosed herein. For example, the local processing and data module 924 and/or the remote processing module 928 can be programmed to perform embodiments of task predictions and determinations using a multitask network trained using the method 90 described with reference to FIGS. 2 and 4. The image capture device can capture video for a particular application (e.g., augmented reality (AR), human-computer interaction (HCI), autonomous vehicles, drones, or robotics in general). The video can be analyzed using a CNN by one or both of the processing modules 924, 928. In some cases, off-loading at least some of the reordering values of input activation maps or kernels, eye image segmentation, or eye tracking to a remote processing module (e.g., in the "cloud") may improve efficiency or speed of the computations. The parameters of the CNN or the DNN (e.g., weights, bias terms, subsampling factors for pooling layers, number and size of kernels in different layers, number of feature maps, etc.) can be stored in data modules 924 and/or 932. For example, the data modules 924, 932 can store the parameters that have been learned from training using the meta-learning and meta-networks described herein.

The results of task predictions or determinations (e.g., the output of the meta-learning multitask network 900 described with reference to FIGS. 2 and 4) can be used by one or both of the processing modules 924, 928 for additional operations or processing. For example, the processing modules 924, 928 of the wearable display system 900 can be programmed to perform additional applications (such as applications in augmented reality, human-computer interaction (HCI), autonomous vehicles, drones, or robotics in general) based on the output of the multitask network.

Additional Tasks

Embodiments of meta-learning are not limited to computer vision tasks, where the meta-network is trained on images or visual data. In other embodiments, the training sample can include non-imaginary data captured by sensors, such as audio data, acceleration data, positioning data, temperature data, radio frequency data, and optical tracking data. Examples of sensors include audio sensors (e.g., microphones), inertial measurement units (IMUs), accelerometers, compasses, gyroscopes, temperature sensors, movement sensors, depth sensors, global positioning system (GPS) units, and radio devices. In other embodiments, the training sample can include measurements, such as gender, age, heart rate, body temperature, white cell count, disease state, disease progression, symptoms, disease diagnosis, etc. For example, for tasks relating to speech recognition or natural language processing, the training sample can include audio data sets (or audio data that accompanies a video) or electronic representations or embeddings (e.g., n-grams) of words, sentences, paragraphs, and texts. Tasks can include, for example, part-of-speech (POS) tagging, chunking dependency parsing, semantic relatedness, or textual entailment.

Tasks that can learned by a multi-network can comprise a regression task, a classification task, or a combination thereof. The tasks can comprise, for example, a perception task, such as the face recognition, visual search, gesture identification or recognition, semantic segmentation, object detection, room layout estimation, cuboid detection, lighting detection, simultaneous localization and mapping, relocalization of an object or an avatar, or speech processing tasks such as speech recognition or natural language processing, or a combination thereof.

Tasks that can be learned by a multi-network can be related to medical treatment or medical decision making. For example, tasks can include determination of which laboratory tests should be performed on or a risk assessment for a patient who might have a particular disease. As such an example, training data can include measurements (e.g., gender, age, heart rate, body temperature, white cell count, etc.) of patients with a particular disease or symptom (e.g., pneumonia). Embodiments of meta-learning can be used to train a multitask network for predicting risk assessment or laboratory tests for a patient.

Thus the training data used by meta-learning can include images, video, audio, electronic records, databases, etc., which may be associated with a respective training label, classification or signal.

In some embodiments, the meta-learning methods disclosed herein can have applications in computer vision, natural language processing, speech synthesis, domain-specific applications such as traffic prediction, general cross-domain applications, or curriculum learning. In some implementations, tasks are jointly trained based on global rewards such as a total loss decrease. Embodiments of meta-learning can be applied to train multitask neural networks used for augmented, mixed, or virtual reality (see, e.g., the augmented reality system described with reference to FIG. 5, which can store and utilize such meta-learning-trained neural networks for AR-related tasks such as, e.g., computer vision or language processing).

Additional Aspects

In a 1 st aspect, a system for training a multi-task neural network using meta-learning is disclosed. The system comprises: non-transitory storage configured to store: a multi-task neural network configured to determine outputs associated with a plurality of tasks, each task of the plurality of tasks associated with a task loss function, the multi-task neural network associated with a multi-task loss function comprising a combination of a task weight and the task loss function for each of the plurality of tasks; a meta-network configured to output the task weights associated with each of the tasks of the plurality of tasks, the meta-network associated with a meta-network loss function comprising an expected loss based at least partly on the multi-task loss function; a hardware processor in communication with the non-transitory storage, the hardware processor programmed to: access training data associated with a plurality of reference task outputs for the plurality of tasks; reduce or minimize the meta-network loss function to determine estimated task weights associated with each of the tasks of the plurality of tasks; reduce or minimize the multi-task loss function based at least in part on the estimated task weights; and output a trained multi-task neural network.

In a 2nd aspect, the system of aspect 1, wherein the tasks of the multi-task neural network are associated with scene understanding.

In a 3rd aspect, the system of any one of aspects 1 or 2, wherein the tasks comprise at least one of semantic segmentation, depth, or surface normal.

In a 4th aspect, the system of any one of aspects 1-3, wherein the multi-task loss function comprises a linear combination of the task weight multiplied by the task loss function for all of the tasks in the plurality of tasks.

In a 5th aspect, the system of any one of aspects 1-4, wherein the meta-network comprises a long short term memory (LSTM) module.

In a 6th aspect, the system of any one of aspects 1-5, wherein the meta-network loss function comprises a sum of the multi-task loss function over an optimization trajectory for a training window.

In a 7th aspect, the system of any one of aspects 1-6, wherein to reduce or minimize the meta-network loss function, the hardware processor is programmed to apply back propagation through time using adaptive moment estimation.

In an 8th aspect, the system of any one of aspects 1-7, wherein to reduce or minimize the multi-task loss function, the hardware processor is programmed to apply stochastic gradient descent.

In a 9th aspect, the system of any one of aspects 1-8, wherein the multi-task neural network comprises a convolutional neural network.

In a 10th aspect, the system of any one of aspects 1-9, wherein the hardware processor is further programmed to: monitor values of the multi-task loss function and the meta-network loss function at each training time; and determine a task-level curriculum for jointly training the plurality of tasks.

In an 11th aspect, a method for using meta-learning and a meta-network to train a child neural network is described. The method comprises: accessing a meta-network configured to output adaptive weights for a child neural network; training the meta-network based at least partly on a child loss function for the child neural network, the child loss function depending at least in part on the adaptive weights; outputting, with the meta-network, updated adaptive weights; training the child neural network, using the updated adaptive weights; and outputting a trained child network. The method can be performed under control of a hardware processor. The hardware processor can be in communication with non-transitory memory configured to store the meta-network and the child neural network.

In a 12th aspect, the method of aspect 11, further comprising accessing a training data set for training the meta-network and the child network.

In a 13th aspect, the method of any one of aspects 11 or 12, wherein the meta-network comprises a recurrent neural network.

In a 14th aspect, the method of aspect 13, wherein the recurrent neural network comprises a long short term memory (LSTM) module.

In a 15th aspect, the method of any one of aspects 11-14, wherein the child neural network comprises a multi-task neural network.

In a 16th aspect, the method of aspect 15, wherein the multi-task neural network comprises a multi-task loss function that comprises a combination of the adaptive weights and task loss functions associated with individual tasks.

In a 17th aspect, the method of any one of aspects 11-16, further comprising determining a task-level curriculum associated with jointly training the individual tasks.

In an 18th aspect, the method of any one of aspects 11-17, wherein training the meta-network comprises monitoring a trajectory of a meta-network loss function over a training window.

In a 19th aspect, a head mounted display system is described. The head mounted display system comprises: non-transitory memory configured to store: executable instructions, and a multi-task network for determining outputs associated with a plurality of tasks, wherein the multitask network is trained using: a meta-network configured to output adaptive weights for the plurality of tasks of the multi-task network; a multi-task loss function for the multi-task neural network, the multi-task loss function depending at least in part on the adaptive weights learned by the meta-network; a display; a sensor; and a hardware processor in communication with the non-transitory memory and the display and the sensor, the hardware processor programmed by the executable instructions to: receive a sensor datum captured by the sensor; determine a task output for each task of the plurality of tasks using the multi-task network with the sensor datum as input; and cause the display to show information related to the determined task outputs to a user of the head-mounted display system.

In a 20th aspect, the system of aspect 19, wherein the plurality of tasks comprises a plurality of perceptual tasks.

In a 21st aspect, the system of aspect 20, wherein the plurality of perceptual tasks comprises face recognition, visual search, gesture identification, semantic segmentation, depth estimation, surface normal estimation, scene recognition, object detection, lighting detection, simultaneous localization and mapping, relocalization, or a combination thereof.

In a 22nd aspect, the system of any one of aspects 19-21, wherein the sensor comprises an inertial measurement unit, an outward-facing camera, a depth sensing camera, a microphone, an eye imaging camera, or a combination thereof.

In a 23rd aspect, a system for training a neural network to learn a set of tasks is described. The system comprises: non-transitory memory configured to store: executable instructions; and a child network for learning a plurality of tasks, wherein the child network is associated with a loss function for the plurality of tasks and a task weight is assigned to each task of the plurality of tasks; a hardware processor in communication with the non-transitory memory, the hardware processor programmed by the executable instructions to: determine a first child network loss associated with the loss function of the child network; determine an updated task weight for each task of the plurality of tasks based on the first child network loss; determine an updated child network based on the updated task weights for each task of the plurality of tasks; determine a second child network loss associated with the loss function of the updated child network; and determine a second updated task weight for each task of the plurality of tasks based at least on the second child network loss.

In a 24th aspect, the system of aspect 23, wherein the hardware processor is further programmed to learn a relationship between the first and second child network loss.

In a 25th aspect, the system of any one of aspects 23 or 24, wherein the hardware processor is programmed to determine the second updated task weight based on at least the relationship between the first and second child network loss.

In a 26th aspect, the system of any one of aspects 23-25, wherein the plurality of tasks comprise at least semantic segmentation, depth prediction, and surface normal estimation.

In a 27th aspect, the system of any one of aspects 23-26, wherein the plurality of tasks comprises a regression task, a classification task, or a combination thereof.

In a 28th aspect, the system of aspect 27, wherein the classification task comprises perception, face recognition, visual search, gesture recognition, semantic segmentation, object detection, room layout estimation, cuboid detection, lighting detection, simultaneous localization and mapping, relocalization, speech processing, speech recognition, natural language processing, or a combination Additional Considerations Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time. As another example, training a deep multitask network using embodiments of the meta-learning methods described herein are computationally challenging and can be implemented on graphical processing units (GPUs), application specific integrated circuits (ASICs), or floating point gate arrays (FPGAs).

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described herein may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A system for training a multi-task neural network using meta-learning, the system comprising:
    non-transitory storage configured to store:
        a multi-task neural network configured to determine outputs associated with a plurality of tasks, each task of the plurality of tasks associated with a task loss function, the multi-task neural network associated with a multi-task loss function comprising a combination of a task weight and the task loss function for each of the plurality of tasks;
        a meta-network configured to output the task weights associated with each of the tasks of the plurality of tasks, the meta-network associated with a meta network loss function comprising an expected loss based at least partly on the multi-task loss function;
    a hardware processor in communication with the non-transitory storage, the hardware processor programmed to:
        access training data associated with a plurality of reference task outputs for the plurality of tasks;
        reduce or minimize the meta-network loss function to determine estimated task weights associated with each of the tasks of the plurality of tasks;
        reduce or minimize the multi-task loss function based at least in part on the estimated task weights; and
        output a trained multi-task neural network,
    wherein the tasks of the multi-task neural network are associated with scene understanding, and wherein the tasks comprise at least one of semantic segmentation, depth, or surface normal.

2. The system of claim 1, wherein to reduce or minimize the multi-task loss function, the hardware processor is programmed to apply stochastic gradient descent.

3. The system of claim 1, wherein the multi-task neural network comprises a convolutional neural network.

4. A system for training a multi-task neural network using meta-learning, the system comprising:
    non-transitory storage configured to store:
        a multi-task neural network configured to determine outputs associated with a plurality of tasks, each task of the plurality of tasks associated with a task loss function, the multi-task neural network associated with a multi-task loss function comprising a combination of a task weight and the task loss function for each of the plurality of tasks;
        a meta-network configured to output the task weights associated with each of the tasks of the plurality of tasks, the meta-network associated with a meta network loss function comprising an expected loss based at least partly on the multi-task loss function;
    a hardware processor in communication with the non-transitory storage, the hardware processor programmed to:
        access training data associated with a plurality of reference task outputs for the plurality of tasks;

reduce or minimize the meta-network loss function to determine estimated task weights associated with each of the tasks of the plurality of tasks;
reduce or minimize the multi-task loss function based at least in part on the estimated task weights; and
output a trained multi-task neural network,
wherein the multi-task loss function comprises a linear combination of the task weight multiplied by the task loss function for all of the tasks in the plurality of tasks.

5. A system for training a multi-task neural network using meta-learning, the system comprising:
non-transitory storage configured to store:
a multi-task neural network configured to determine outputs associated with a plurality of tasks, each task of the plurality of tasks associated with a task loss function, the multi-task neural network associated with a multi-task loss function comprising a combination of a task weight and the task loss function for each of the plurality of tasks;
a meta-network configured to output the task weights associated with each of the tasks of the plurality of tasks, the meta-network associated with a meta network loss function comprising an expected loss based at least partly on the multi-task loss function;
a hardware processor in communication with the non-transitory storage, the hardware processor programmed to:
access training data associated with a plurality of reference task outputs for the plurality of tasks;
reduce or minimize the meta-network loss function to determine estimated task weights associated with each of the tasks of the plurality of tasks;
reduce or minimize the multi-task loss function based at least in part on the estimated task weights; and
output a trained multi-task neural network,
wherein the meta-network loss function comprises a sum of the multi-task loss function over an optimization trajectory for a training window.

6. A system for training a multi-task neural network using meta-learning, the system comprising:
non-transitory storage configured to store:
a multi-task neural network configured to determine outputs associated with a plurality of tasks, each task of the plurality of tasks associated with a task loss function, the multi-task neural network associated with a multi-task loss function comprising a combination of a task weight and the task loss function for each of the plurality of tasks;
a meta-network configured to output the task weights associated with each of the tasks of the plurality of tasks, the meta-network associated with a meta network loss function comprising an expected loss based at least partly on the multi-task loss function;
a hardware processor in communication with the non-transitory storage, the hardware processor programmed to:
access training data associated with a plurality of reference task outputs for the plurality of tasks;
reduce or minimize the meta-network loss function to determine estimated task weights associated with each of the tasks of the plurality of tasks;
reduce or minimize the multi-task loss function based at least in part on the estimated task weights; and
output a trained multi-task neural network,
wherein to reduce or minimize the meta-network loss function, the hardware processor is programmed to apply back propagation through time using adaptive moment estimation.

7. A system for training a multi-task neural network using meta-learning, the system comprising:
non-transitory storage configured to store:
a multi-task neural network configured to determine outputs associated with a plurality of tasks, each task of the plurality of tasks associated with a task loss function, the multi-task neural network associated with a multi-task loss function comprising a combination of a task weight and the task loss function for each of the plurality of tasks;
a meta-network configured to output the task weights associated with each of the tasks of the plurality of tasks, the meta-network associated with a meta network loss function comprising an expected loss based at least partly on the multi-task loss function;
a hardware processor in communication with the non-transitory storage, the hardware processor programmed to:
access training data associated with a plurality of reference task outputs for the plurality of tasks;
reduce or minimize the meta-network loss function to determine estimated task weights associated with each of the tasks of the plurality of tasks;
reduce or minimize the multi-task loss function based at least in part on the estimated task weights;
output a trained multi-task neural network;
monitor values of the multi-task loss function and the meta-network loss function at each training time; and
determine a task-level curriculum for jointly training the plurality of tasks.

8. A method for using meta-learning and a meta-network to train a child neural network, the method comprising:
accessing a meta-network configured to output adaptive weights for a child neural network, wherein the meta-network comprises a recurrent neural network, wherein the child neural network comprises a multi-task neural network, and wherein the multi-task neural network comprises a multi-task loss function that comprises a combination of the adaptive weights and task loss functions associated with individual tasks;
accessing a training data set for training the meta-network and the child network;
training the meta-network based at least partly on a child loss function for the child neural network, the child loss function depending at least in part on the adaptive weights;
outputting, with the meta-network, updated adaptive weights;
training the child neural network, using the updated adaptive weights;
outputting a trained child network; and
determining a task-level curriculum associated with jointly training the individual tasks.

9. The method of claim 8, wherein the recurrent neural network comprises a long short term memory (LSTM) module.

10. A method for using meta-learning and a meta-network to train a child neural network, the method comprising:
accessing a meta-network configured to output adaptive weights for a child neural network, wherein the meta-network comprises a recurrent neural network;
accessing a training data set for training the meta-network and the child network;

training the meta-network based at least partly on a child loss function for the child neural network, the child loss function depending at least in part on the adaptive weights, wherein training the meta-network comprises monitoring a trajectory of a meta network loss function over a training window outputting, with the meta-network, updated adaptive weights;

training the child neural network, using the updated adaptive weights; and outputting a trained child network.

\* \* \* \* \*